United States Patent [19]

Schnebly et al.

[11] Patent Number: 4,647,488

[45] Date of Patent: Mar. 3, 1987

[54] METHOD AND APPARATUS FOR MOUNTING AND SEALING HONEYCOMB INSULATION MATERIAL

[75] Inventors: John T. Schnebly, Boulder; Richard S. Steele, Broomfield; Wendell B. Colson, Boulder, all of Colo.

[73] Assignee: Hunter Douglas, Inc., Maywood, N.J.

[21] Appl. No.: 638,860

[22] Filed: Aug. 7, 1984

[51] Int. Cl.[4] .................... B32B 3/12

[52] U.S. Cl. .................... 428/116; 160/84 R

[58] Field of Search .................... 428/116, 118; 160/84 R; 156/197

[56] References Cited

U.S. PATENT DOCUMENTS

| | | | |
|---|---|---|---|
| 1,229,523 | 6/1917 | Roehrich | 160/84 R |
| 2,201,356 | 5/1940 | Terrell | 160/84 R |
| 2,674,295 | 4/1954 | Steele et al. | 156/197 |
| 4,019,554 | 4/1977 | Rasmussen | 428/116 X |
| 4,045,911 | 9/1977 | Ware | 47/17 X |
| 4,187,896 | 2/1980 | Shore | 428/12 X |
| 4,247,583 | 1/1981 | Roy | 428/116 |
| 4,307,768 | 12/1981 | Anderson | 428/116 X |
| 4,347,887 | 9/1982 | Brown | 428/116 X |
| 4,388,354 | 6/1983 | Suominen | 428/116 X |
| 4,450,027 | 5/1984 | Colson | 428/116 X |
| 4,453,584 | 6/1984 | Steele | 428/100 X |
| 4,500,380 | 2/1985 | Bova | 156/197 |

*Primary Examiner*—Henry F. Epstein

*Attorney, Agent, or Firm*—Pennie & Edmonds

[57] ABSTRACT

Mounting apparatus for expandable honeycomb insulation panels includes a head rail for anchoring the panel to a window jamb or wall and a sill rail at the opposite end of the honeycomb panel for contracting and expanding the honeycomb panel to move it upwardly and downwardly over the window surface. Lift mechanisms for the sill rail include a vertical drop cord lift system, a parallel bar cord guided system, and a continuous loop cord system. Edge seals for closing and sealing the end of the honeycomb insulation panel include a biased, elongated seal element positioned in side tracks for slideably guiding the honeycomb panel along a prescribed track while sealing the ends thereof. In an alternate embodiment, notched bearing edges are provided to accommodate a web track protruding therein. Other features include adjustable panel mounting, bracket, and cord lock roller.

36 Claims, 38 Drawing Figures

244
246
290
242
12
62
290
248
61
234
250
18
22
32
20
16
64
246
254
252
216
142
14
256
234
258

FIG. 11
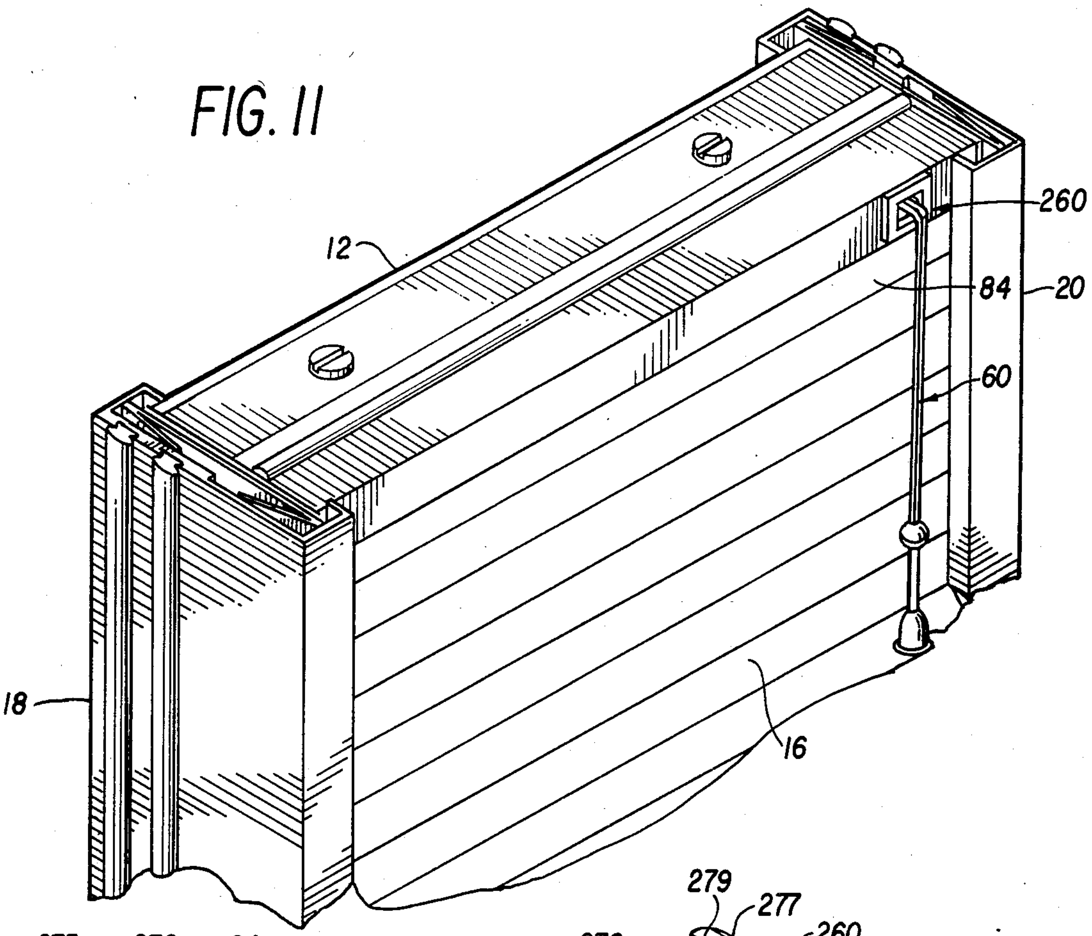
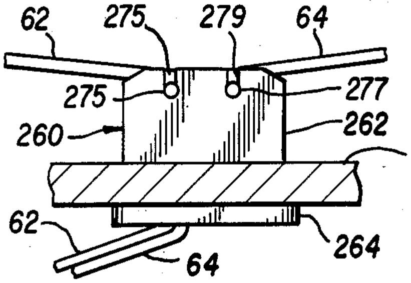
FIG. 13
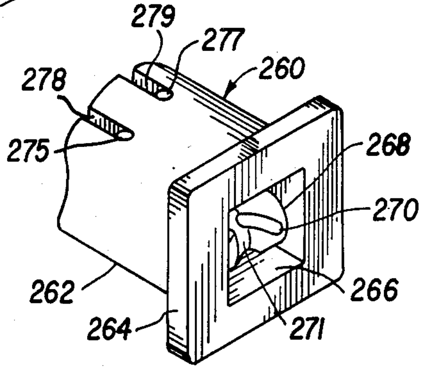
FIG. 12
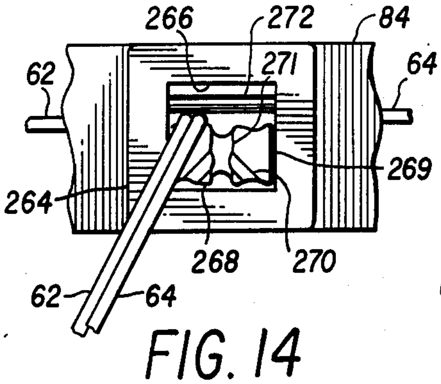
FIG. 14
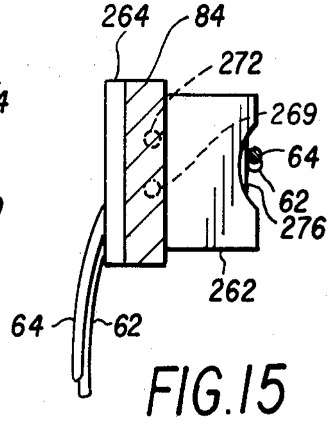
FIG. 15
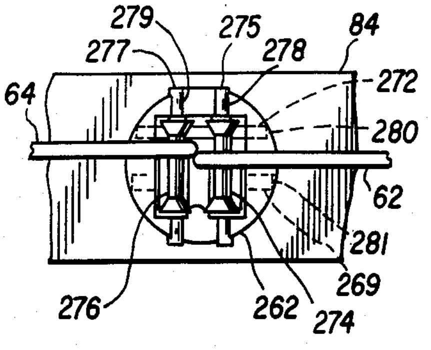
FIG. 16

METHOD AND APPARATUS FOR MOUNTING AND SEALING HONEYCOMB INSULATION MATERIAL

BACKGROUND OF THE INVENTION

The present invention is related to moveable insulation and decorative window coverings, and more particularly to method and apparatus for mounting and sealing movable honeycomb insulation panels over windows.

The increased cost of energy and general raising of energy consciousness over the past decade has resulted in a developing interest in methods and apparatus for covering windows, not only for privacy and aesthetic effects, but also for insulation effect. Such window coverings, of course, have to be moveable so that they can be raised and lowered during different times of the day and during different seasons. In order to satisfy the needs of most users, they also have to be aesthetically pleasing, durable, easy to install, adjustable, and relatively inexpensive.

This combination of desirable features, including a moveable material having a significant insulating effect and being aesthetically pleasing in appearance has not been an easily attained goal. There have been a number of different developments in this area, such as the inflatable curtains disclosed in U.S. Pat. No. 4,187,896, issued to R. Shore and in U.S. Pat. No. 4,453,584, issued to R. Steele. Another kind of development in this area includes the use of expandable honeycomb panels having a plurality of cellular tubes fastened together to form panels. U.S. Pat. No. 4,450,027, issued to W. Colson, is one example of such material. Such expandable honeycomb material appears at the present time at least to hold the most promise for meeting the goals of moveable insulation that is both aesthetically pleasing and has a significant insulating effect. It also is more conducive to mass production and mass marketing to consumers.

There are a number of problems in the use of cellular honeycomb material for moveable insulation that have heretofore not been solved. For example, most of the past effort up to this time has been directed to developing economical and suitable processes for fabricating honeycomb insulation panels that are capable of enduring long life and severe environments of high temperature and exposure to sunlight and moisture, while always maintaining an aesthetically pleasing appearance. However, prior to this invention, the methods and apparatus utilized for mounting such expandable honeycomb insulation panels over windows have been rather crude and not conducive to mass marketing or installation by individual home owners or relatively unskilled persons. Further, in order to maximize the insulating effect of the expandable honeycomb panels, the open ends of the tubular cell sections must be sealed. Prior to this invention, there was no suitable method and apparatus for mounting expandable honeycomb insulation panels over windows with the edges sealed while maintaining an aesthetically pleasing appearance and being easily operable.

SUMMARY OF THE INVENTION

Accordingly, it is an object of the present invention to provide a novel method and apparatus for mounting and sealing moveable honeycomb insulation panels over windows.

It is also an object of the present invention to provide edge seals for moveable honeycomb insulation that effectively closes and seals the ends of the tubular insulation cells, while allowing free expansion and contraction of the honeycomb panels for moving the panels over and away from the window openings over which they are mounted.

It is also an object of the present invention to provide a method and apparatus for easily and conveniently mounting or hanging moveable honeycomb insulation panels over windows wherein the length of the panels can be individually adjustable.

It is also an object of the present invention to provide methods and apparatus for operably moving the honeycomb insulation panels over and away from windows while maintaining the integrity of the edge seals.

The present invention includes a method and apparatus for adjustably and securely attaching a honeycomb panel to a head rail for mounting in a window, as well as vertical drop, continuous loop, and parallel bar arrangements for drawing the panels over and away from windows. Low friction cord rollers and a lock device for reducing cord wear are provided in variations of the preferred embodiments. Edge seals and side tracks are provided to close and seal the open ends of the honeycomb cells and to guide the panel during movement thereof. The edge seals and side track combinations include elongated wet strips positioned against the lateral edges of the panel and inside the channel-shaped side tracks. The webs are biased toward the lateral edges of the panel by resilient or strut extensions from the web bearing against the web of the channel.

An alternate embodiment shows notched bearing surfaces in the lateral edges of the panels with a protruding rib or web-like edge track inserted into the notched bearing surfaces. Alternate edge seals and a lift drive for this invention include concealed cords at the lateral edges of the honeycomb panel.

BRIEF DESCRIPTION OF THE DRAWINGS

These and other objects of the present invention will become more apparent as the description proceeds, taken in conjunction with the accompaning drawings, in which:

FIG. 11 is a partial perspective view showing an alternate embodiment cord lock and roller assembly in the head rail for reduced friction and cord wear;

FIG. 12 is an enlarged sectional view of the cord lock and roller assembly shown in FIG. 11;

FIG. 13 is a top plan view of the cord lock and roller assembly;

FIG. 14 is a front elevation view of the cord lock and roller assembly;

FIG. 15 is a side elevation view of the cord lock and roller assembly;

FIG. 16 is a rear elevation view of the cord lock and roller assembly;

DETAILED DESCRIPTION OF THE PREFERRED EMBODIMENT

Figure 1:
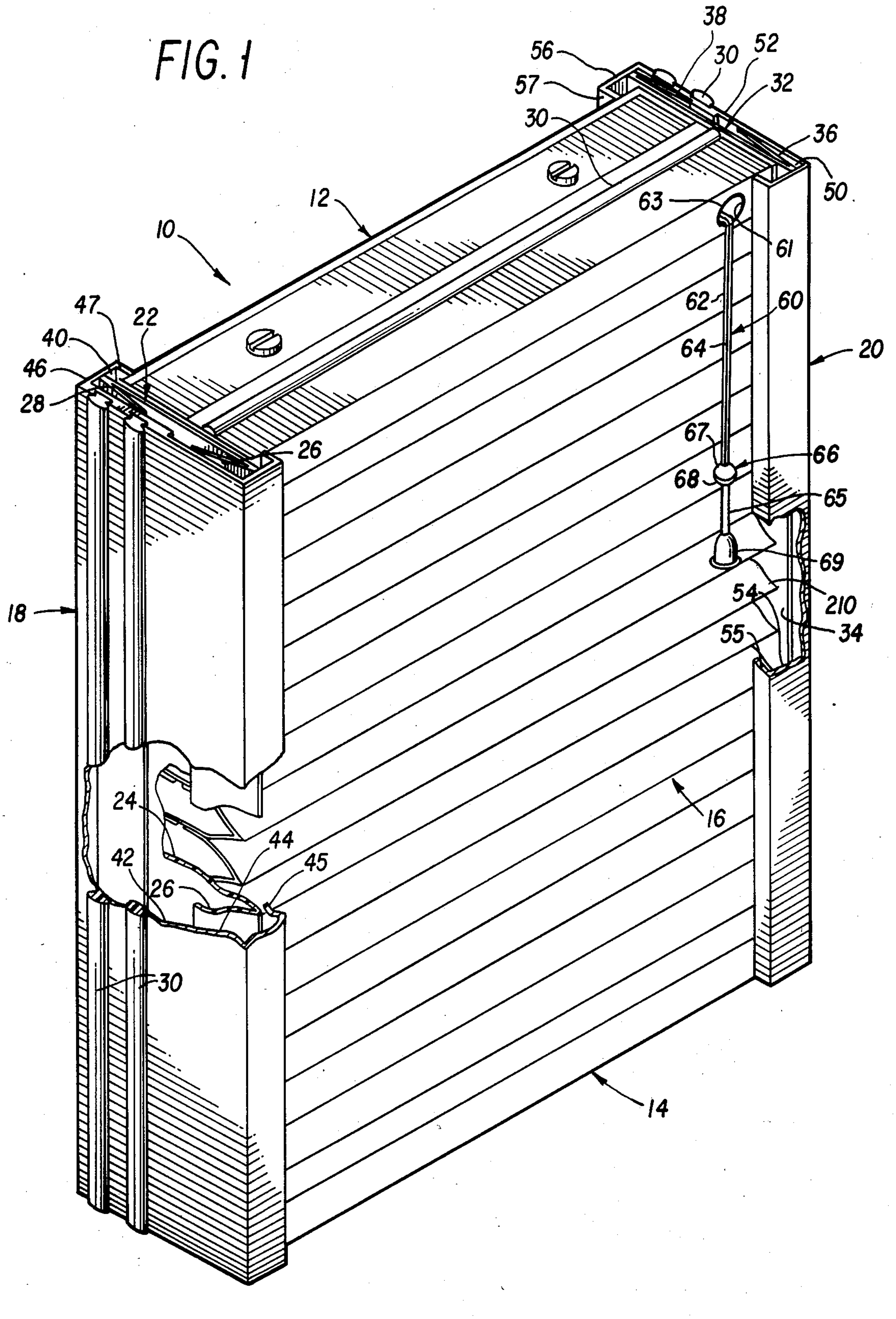
FIG. 1 is a perspective view of a honeycomb window covering unit according to the present invention.

The first preferred embodiment of the present invention is the vertical drop honeycomb window covering unit shown in FIG. 1. An expandable honeycomb insulation panel 16 is comprised of a plurality of tubular cell sections 210 adhered or fastened together in parallel relationship to each other so that they can be compressed and contracted together or expanded and extended apart. This honeycomb cellular panel 16 is mounted in and suspended from a head rail 12. A moveable sill rail 14 is fastened to the bottom of the honeycomb panel 16 for weight and to provide structural integrity to the bottom of the panel. A lift mechanism, several embodiments of which will be described below, is provided for pulling the sill rail 14 upwardly to collapse the honeycomb panel between the sill rail 14 and head rail 12 when it is preferred to have the window uncovered and to drop the sill rail 14 downwardly to expand the honeycomb panel 16 over the window when it is desired to cover the window. A pull cord 60, shown in FIG. 1, is provided for this purpose as will be described in more detail below.

In order to provide a significant insulating quality, the open ends of the tubular honeycomb cells 210 of the honeycomb panel 16 must be closed and sealed. With each such tubular cell sealed at the ends, a plurality of dead air spaces are provided by the expanded honeycomb panel 16 between the window and the interior environment. Further, a suitable seal at the edges of the honeycomb panel 16 should prevent infiltration from the window behind the honeycomb panel 16 into the interior environment of a room.

Such edge seals are provided in the present invention by edge seal elements 22, 32 positioned respectively in left and right side tracks 18, 20, as will be described in more detail below. Weather stripping 30 is also provided around the entire honeycomb window covering unit 10 to further decrease the possibility of infiltration of air from one side of the honeycomb window covering unit to the other.

Figure 2:
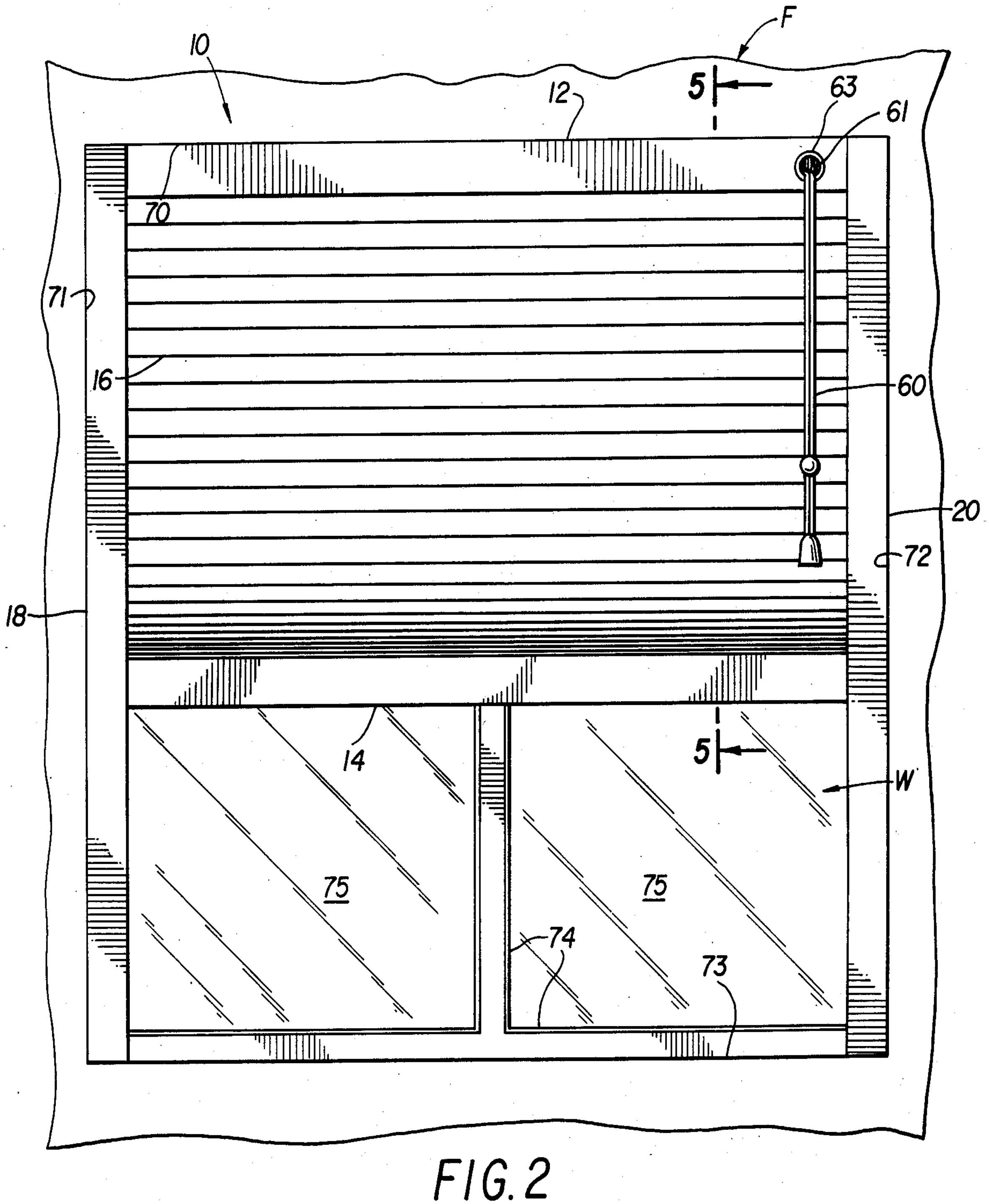
FIG. 2 is a front elevation view of a honeycomb window covering unit according to the present invention mounted over a window, the illustration therein being with the insulating shade unit half drawn over the window.

A typical window W mounted in building frame F is shown in FIG. 2. Such a window typically includes one or more window panes 75 mounted in sash bars 74. The window sashes are typically mounted in a frame comprised of a head jamb 70, left and right side jambs 71, 72, respectively, and the sill 73 at the bottom. The front elevation view in FIG. 2 shows the honycomb window covering unit 10 of the present invention installed and in place over a window W in a building frame F. The head rail 12 is fastened to the head jamb 70 of the window. The left side track 18 is fastened to the left side jamb 71, and the right side track 20 is fastened to the right side jamb 72. The sill rail 14 is moveable upwardly and downwardly over the window W by operating pull cord 60. Such upward and downward movement of the sill rail 14 expands and contracts the honeycomb panel 16 over the surface of the window W.

The honeycomb panel 16, illustrated in FIG. 2, is shown in a partially drawn position with a part of the window W exposed. As shown in more detail in the exploded perspective view in FIG. 3 and the enlarged cross-sectional view in FIG. 5, the honeycomb panel 16 is mounted in and suspended by the head rail 12. The sill rail 14 is attached to the bottom of the honeycomb panel 16 and is suspended on two cords 62, 64. It should be noted here that in some embodiments having very wide honeycomb panels 16 it may be desirable to provide more than two suspension cords; however, two suspension cords are sufficient in most installations and are sufficient for purposes of this description.

The head rail 12 is preferably comprised of an extruded channel having a web 82, front and rear flanges 84, 86, respectively, defining an interior chamber 80. The chamber 80 is partially closed on the bottom by a front lip 88 extending inwardly from the bottom of the front flange 84, and a rear lip 90 extending partially inward from the bottom of the rear flange 86. A longitudinal rib 100 extends along the length of the inside of front flange 84, and a longitudinal channel 102 extends along the length of the inside surface of the rear flange 86. This longitudinal rib 100 and longitudinal channel 102 are utilized for mounting components as will be described in more detail below.

The web 82 of head rail 12 has a recessed portion 92 toward the rear thereof for accommodating the mounting bracket 290, as will be described in more detail below. An elongated tongue 94 extends partially over the recessed portion 92 to form a longitudinal slot 96. A shoulder 98 is formed at the rear edge of the web 82 adjacent the rear flange 86. This tongue 94, slot 96, and shoulder 98 are designed to engage the mounting bracket 290 as will be described in more detail below. A channel 104 is also provided in the web 82 for having mounted therein a weather stripping element 30.

Figure 5:
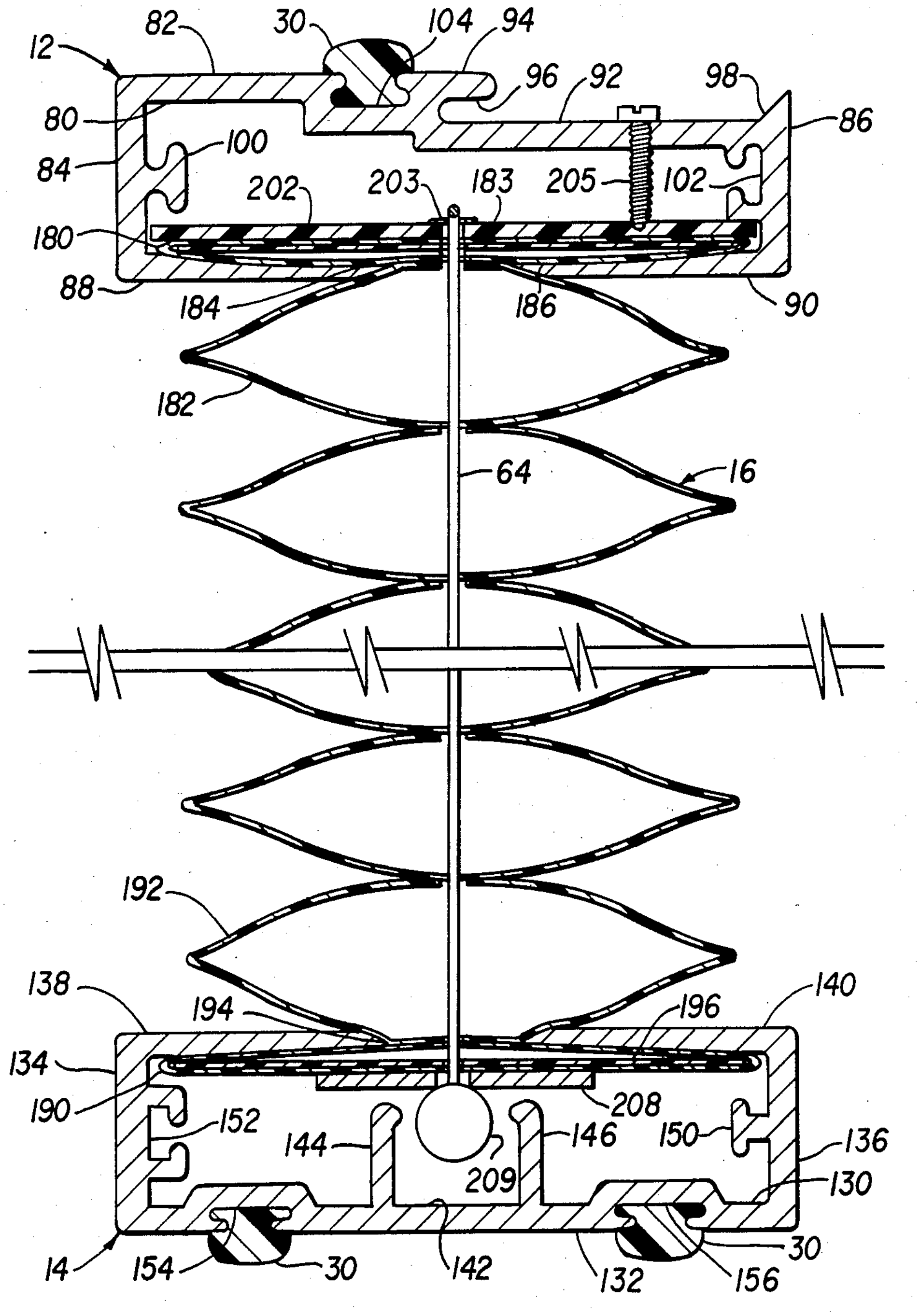
FIG. 5 is a cross-sectional view of the honeycomb window covering unit taken along lines 5—5 of FIG. 2.

The honeycomb panel 16 is attached to the head rail 12 by inserting the top tubular cell 180 through the opening between lips 88, 90, as best shown in FIG. 5. The opening between lips 88, 90 should be of sufficient width to accommodate the full width of the glue line or attachment surface area 184 between the top tubular cell 180 and the next adjacent tubular cell 182 so that distortion of the cells does not occur. The top tubular cell 180 is then flattened in the chamber 80 inside head rail 12 as shown.

Since the tubular cells, such as the top cell 180 and next adjacent cell 182 of honeycomb panel 16 are typically fabricated of quite flexible thin film materials, they do not have sufficient structural rigidity to maintain themselves in the mounted position in head rail 12. When any significant amount of weight is suspended on the panel 16, the upper tubular cell 180 would simply fold and be pulled downwardly through the opening between lips 88, 90 if some additional stiffener material is not provided. Therefore, a significant feature of the present invention includes a flat, elongated stiffener member 186 inserted through the top tubular cell 180 inside the head rail 12. This stiffener member 186 is wider than the opening between lips 88, 90 and has sufficient structural resistance to bending or folding in both normal and high temperature environments such that it easily holds the weight of the honeycomb panel 16 while preventing the upper tubular cell 180 from folding and being pulled down through the opening between lips 88, 90.

The sill rail 14 is also comprised of a channel-shaped extrusion having a web 132, front flange 134, and rear flange 136 enclosing a chamber 130. A front lip 138 extends inwardly from the top of front flange 134 and a rear lip 140 extends inwardly from the top of rear flange 136. This sill rail 14 is attached to the honeycomb panel 16 in a manner similar to the attachment of the head rail 12 to the honeycomb panel 16. Specifically, the bottom tubular cell section 190 is flattened and inserted through the opening between lips 138, 140 into the chamber 130 and sill rail 14. A second stiffener member 196 is inserted longitudinally into the bottom tubular cell 190 to prevent extraction thereof from the sill rail 14.

It should be noted that this feature of this invention accommodates is significant in that it accommodates adjustment of the length of the honeycomb panel 16 quite readily and easily by relatively unskilled installers. Such adjustment can be accomplished by varying or changing the number of tubular cells stuffed into either the sill rail or the head rail. For example, referring to FIG. 5, if the actual window size dictates that the honeycomb panel 16 be approximately an inch shorter for proper fit and aesthetics, the second to the bottom tubular cell 192 could also be folded and inserted into the chamber 130 inside sill rail 14. In that case, the stiffener member 196 would be inserted longitudinally through the second to bottom tubular cell 192. It has been found that in normal sized installations with relatively small sized head rails and sill rails for a pleasing appearance in windows, over a foot of adjustment can be provided for the installer in this manner. In other words, the honeycomb panel 16 can be fabricated in standard incremental sizes, while individual users and installers have sufficient flexibility in the field or at home to adjust the actual effective length of the honeycomb panel 16 or to a foot more or less. Such adjustment can be accomplished without cutting or modification to the panel by merely stuffing more or fewer of the top or bottom tubular cells into the head rail or sill rail.

The sill rail 14 also has a longitudinal channel 152 and a longitudinal rib 150 similar to those described in the head rail 12 for component mounting purposes to be described below. It also includes two upright protrusions 144, 146 on the interior surface of the web 132 to form an interior channel 142 along the length of the sill rail 14 for purposes described below. Exterior slots 154, 156 in the web 132 are provided for mounting weather stripping 30 therein. The effective length of the honeycomb panel 16 should be adjusted as described above so that the weather stripping 30 on the bottom of sill rail 14 contacts and seals against infiltration at the window sill 73 shown in FIG. 2.

Figure 3:
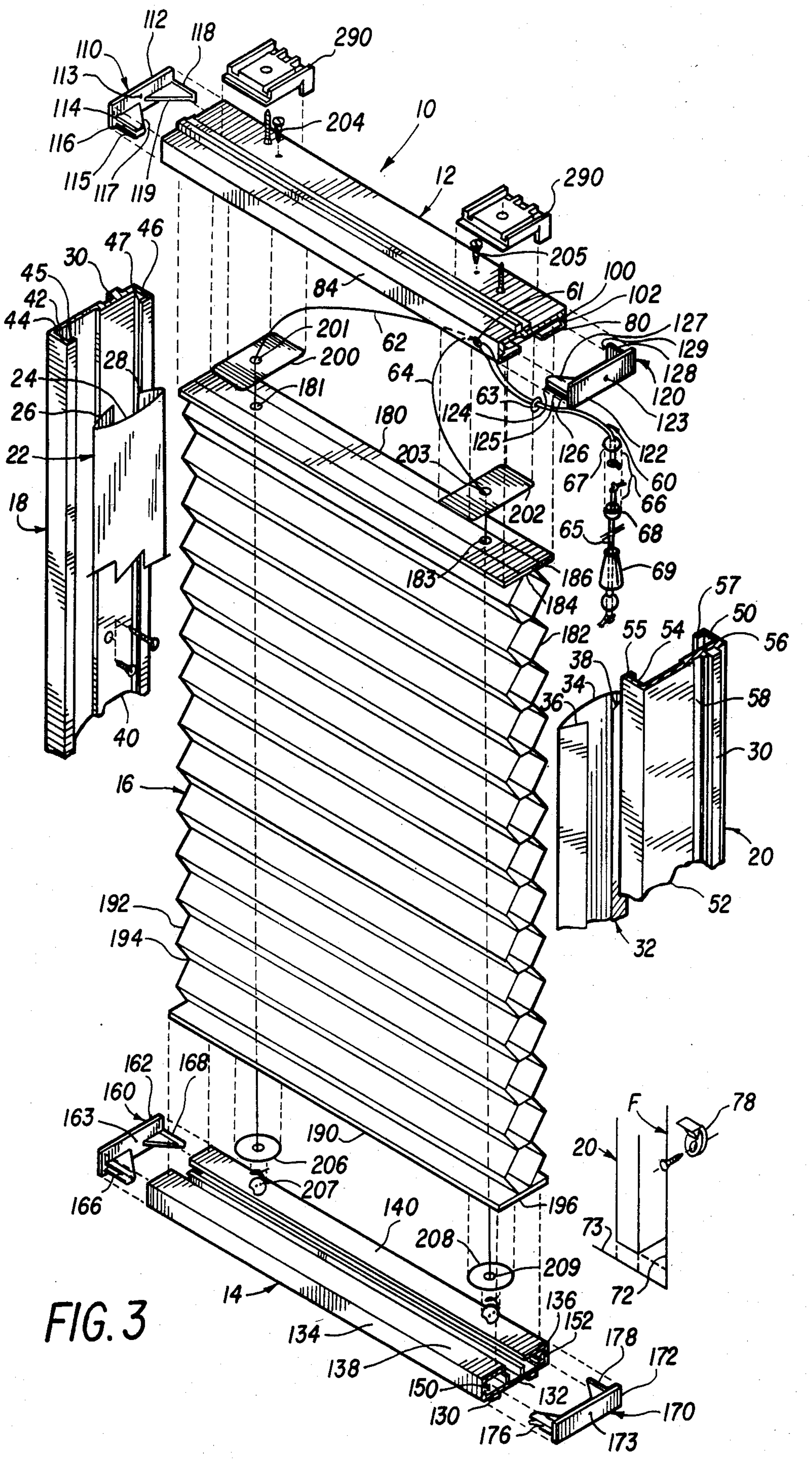
FIG. 3 is a perspective exploded view of the preferred vertical drop embodiment of the honeycomb window covering unit according to the present invention.
Figure 4:
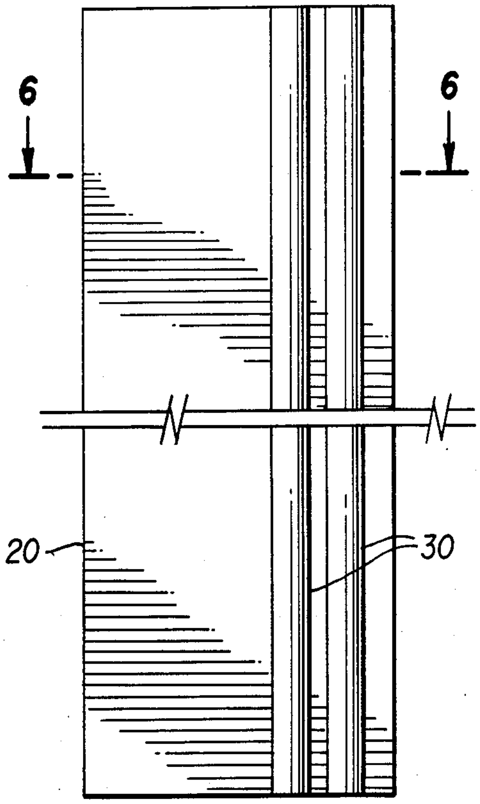
FIG. 4 is a side elevation view of the honeycomb window covering unit of the present invention showing primarily the side track thereof.

As shown in FIG. 3, left and right end caps 110, 120, respectively, are provided to close the ends of the head rail 12. The left end cap 110 has a closure plate 112 with a rib 118 extending inwardly from its rear edge and reinforced by a web 119. A pair of spaced apart ribs 114, 115 extend inwardly from the front edge of closure plate 112 to form a longitudinal channel 116 therebetween. A reinforcing web 117 supports the channel 116. This rib 118 is sized and shaped to mate with the interior channel 102 in head rail 12, and the channel 116 is shaped and sized to engage the longitudinal rib 100 in the interior of head rail 12. Therefore, when the end cap 110 is inserted into the left end of head rail 12, the mating rib 118 and channel 116 engage the channel 102 and rib 100 in the head rail 12 to firmly secure the end cap 110 in place.

Likewise, the right end cap 120 has a rib 128 reinforced by a web 119 on the rear side and a pair of ribs 124, 125 defining a channel 126 reinforced by a web 127 on the front. This rib 128 and channel 126 are also sized and shaped to engage the channel 102 and rib 100 inside head rail 12 to firmly hold the end cap 120 in place.

Likewise, end caps 160, 170 are provided for enclosing the ends of sill rail 14 in a similar manner. For example, left end cap 160 has a closure plate 162, rib 168, and channel 166 adapted to engage channel 152 and rib 150 inside the sill rail 14. The right end cap 170 has a closure plate 172, a rib 178, and a channel 176 also adapted to engage the rib 150 and channel 152 in sill rail 14 to enclose the right end of sill rail 14.

The lift mechanism is preferably described in reference to FIGS. 3 and 5. It is comprised of a lift cord 60 adapted for the user to grasp by hand and pull the sill rail 14 upwardly or allow the sill rail 14 to move downwardly. The pull cord 60 is comprised of two separate cords, a left cord 62, and a right cord 64. These cords extend from the exterior of head rail 12 through a hole 61 in the front flange 84 to the interior chamber 80 of head rail 12. From that point, the left cord 62 extends to a position near the left side of honeycomb panel 16, where it then extends downwardly through the middle of honeycomb panel 16 and into the sill rail 14. In the sill rail 14, the left cord 62 extends through the stiffener member 196 and through a large flat washer 206 positioned under stiffener member 196 and the bottom tubular cell 190. A knot or bead 207 is placed at the lower end of left cord 62 to anchor it under the washer 206. The washer 206 is preferably large enough to bear against the lips 138, 140 of sill rail 14 to firmly anchor the cord 62 in the sill rail 14.

Likewise, the right cord 64 extends downwardly through the stiffener member 186 in the head rail 12, through the right side of honeycomb panel 16 downwardly into the sill rail 14. In sill rail 14, the right cord 64 extends downwardly through the stiffener member 196 and bottom tubular cell 190 and through a large diameter washer 208 and terminates at an anchor knot or bead 209.

Left and right guide plates 200, 202, respectively, are positioned in the head rail 12 to maintain proper alignment of the left and right cords 62, 64 with the holes in the honeycomb panel 16. For example, left guide plate 200 has a hole 201 therethrough positioned directly over hole 181 through the top tubular cell 180 and stiffener member 186. Likewise, the right guide plate 202 has a hole 203 therethrough positioned directly over hole 183 in top tubular cell 180 and stiffener member 186. These guide plates 200, 202 are retained in proper alignment in the head rail 12 by screws 204, 205, respectively. A grommet or eyelet 63 is positioned around the cord 60 in the hole 61 in front flange 84 to reduce wear on the cord 60.

A unitary bottom section 65 of the cord is provided with a handle 69. The bottom cord portion 65 is attached to the left and right cords 62, 64 by a joiner ball 66. The joiner ball 66 is comprised of an upper half 67 and lower half 68 that are adapted to be screwed together with knots of the respective ends of the cord sections enclosed therein. A tie down 78 is fastened to the frame F or window jamb 72 adjacent the side track 20 for tying the pull cord 60 when it is desired to retain the sill rail 14 in a raised position with the honeycomb panel 16 collapsed between the sill rail 14 and head rail 12.

The preferred embodiment edge seals, according to the present invention, are best described in reference to FIGS. 1, 2, 3, 4, and 6. Left and right side tracks 18, 20, respectively, are provided to extend along opposite sides of the honeycomb panel 16. The left and right edge seal elements 22, 32, respectively, are positioned inside the respective left and right side tracks 18, 20 and adjacent the open ends of the cells of the honeycomb panel 16. For example, the right side track 20, which is adapted to be fastened to the right window jamb 72, is comprised of an elongated extruded channel member having a web 52, front flange 54, and rear flange 56. A front lip 55 extends inwardly from the distal end of front flange 54, and a similar lip 57 extends inwardly from the distal end of rear flange 56. Exterior slots 58, 59 are provided to retain weather stripping 30 therein for sealing against the window jamb 72.

Figure 6:
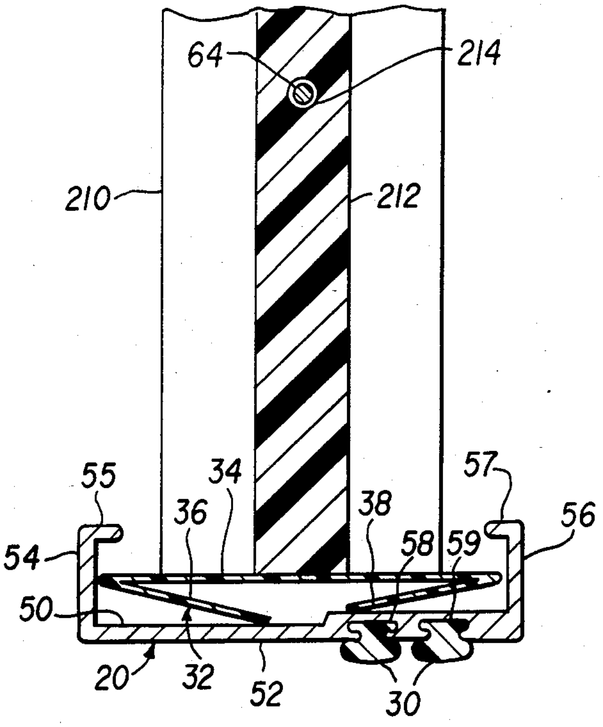
FIG. 6 is a cross-sectional view of the side track and edge seal element taken along lines 6—6 of FIG. 4.

Referring primarily now to FIG. 6, and secondarily to FIGS. 1 and 3, the right seal element 32 is positioned in the interior 50 of side track 20. It is comprised of a web 34 positioned the open end of intermediate honeycomb cell 210 to close and seal the end thereof. A front leg portion 36 extends from a fold at the front edge of the web 34 and at an acute angle thereto into contact with the web 52 of side track 20. Likewise, a rear leg 38 extends from the fold at the rear edge of web 34 into contact with the web 52 of side track 20.

The edge seal element 32 is preferably fabricated of a fairly rigid, resilient thin film material with its natural cross-sectional shape similar to that shown in FIG. 3 with a curved web portion 34 and divergent leg members 36, 38. In this manner, when the honeycomb panel 16 is assembled with the side track 20 and edge seal element 32, the edge seal element 32 will assume the shape shown in FIG. 6 with its web 34 flat against the open end of the cell 210. The legs 36, 38 then tend to bias the web 34 inwardly toward the cell 210 to maintain constant contact and effective closure against the open end of cell 210. Further, this contact is maintained in a sliding manner between the web 34 and the honeycomb panel 16 as the honeycomb panel 16 slides upwardly and downwardly within the track 20. Further, when the honeycomb panel 16 is pulled upwardly, as shown in FIG. 2, the lips 55, 57 retain the edge seal element 32 in position in the side track 20 until the honeycomb panel 16 is dropped downwardly again in sliding contact with the web 34. In this manner, a constant and effective sliding closure and seal is maintained between the web 34 and the cells 210 of honeycomb panel 16 regardless of the position in which honeycomb panel 16 is placed over the window W.

For further description, it is noted that in FIG. 6, the glue line or attachment between the cell 210 and the next adjacent cell above 210 is indicated at 212. Also, the right cord 64 is shown extending through a hole 214 in cell 210 in a typical manner.

Likewise, the left side track 18 is adapted for attachment to the left window jamb 71 and is comprised of a rib 42, front flange 44, and rear flange 46. A front lip 45 extends inwardly from front flange 44, and a rear lip 47 extends inwardly from rear flange 46 for retaining the edge seal element 22 within the interior 40 of side track 18. The edge seal element 22 is comprised of a rib 24 for closing and sealing the open left ends of the cells in honeycomb panel 16, and front and rear leg portions 26, 28 for biasing the rib 24 against the honeycomb panel 16. The side tracks 18, 20 not only serve to retain the edge seal elements 22, 32 in proper position, but they also retain the edges of the honeycomb panel 16 in proper alignment and serve as a guide track for the sill rail 14 in which the sill rail 14 can slide up and down as the panel 16 is raised and lowered.

Figure 7:
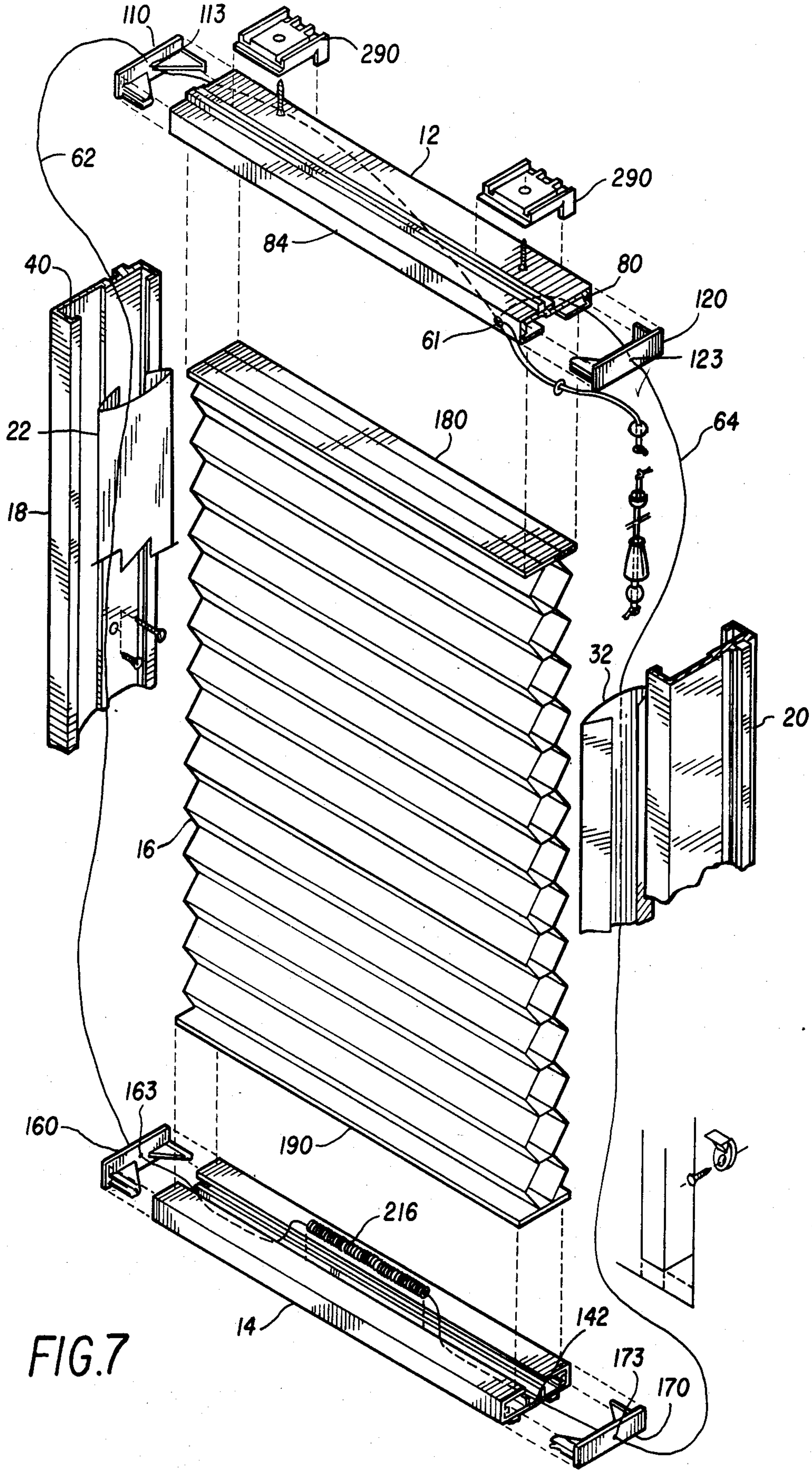
FIG. 7 is an exploded perspective view of an alternate vertical drop embodiment of the present invention wherein the cords are routed through the side tracks rather than through the honeycomb panel.

A variation of the preferred vertical drop embodiment 10 of the honeycomb member covering unit according to this invention is shown in FIG. 7. In this variation, the left and right cords 62, 64 extend respectively through left and right side tracks 18, 20, respectively, instead of through the honeycomb panel 16. For example, the left cord 62, after entering the interior 80 of head rail 12 through hole 61 in front flange 84 exits through a hole 113 in end cap 110. From end cap 110, the left cord 62 extends downwardly through the interior 40 of left side track 18 between the edge seal element 22 in side track 18 to the left end cap 160 of sill rail 14. The cord 62 then enters sill rail 14 through a hole 163 and end cap 160. Likewise, the right cord 64 extends outwardly through hole 123 and end cap 120 and downwardly through side track 20 and into the sill rail 14 through hole 173 in end cap 170. The lower ends of cords 62, 64 are anchored in some manner in sill rail 14.

One preferable method of anchoring the cords is to attach them to a common tension spring 216 positioned in the interior channel 142 of sill rail 14. This tension spring 216 tends to keep the cords 62, 64 tight and in proper position for smooth operation. This alternate cord arrangement, shown in FIG. 7, is preferred when the honeycomb cell material 16 is fabricated of a somewhat transparent material that would expose cords running through the center of the honeycomb panel 16 as described in the preferred embodiment and shown in FIG. 3. The cords 62, 64 are more concealed in the side tracks 18, 20 and they are running through honeycomb panel 16 in such transparent materials. It should be noted, however, that honeycomb panel installations that do not utilize the side tracks 18, 20 and edge seals 22, 32, the embodiment described in FIG. 3 with the cord running through the honeycomb panel 16 would be required.

Figure 9:
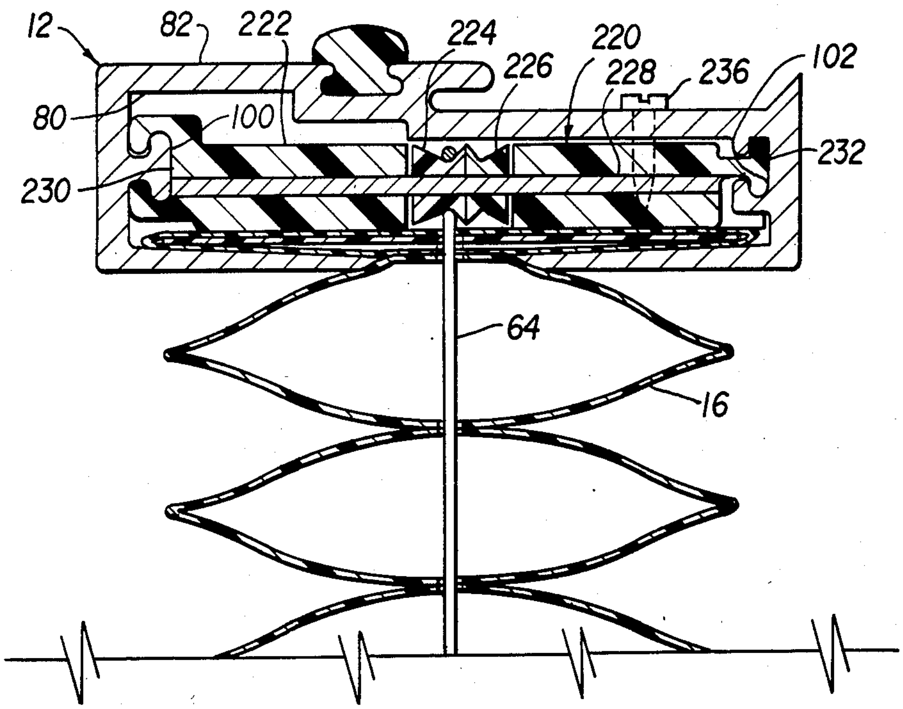
FIG. 9 is an enlarged cross-sectional view of the head rail of the alternate embodiment shown in FIG. 8 further illustrating the position of the pulley block in the head rail.
Figure 8:
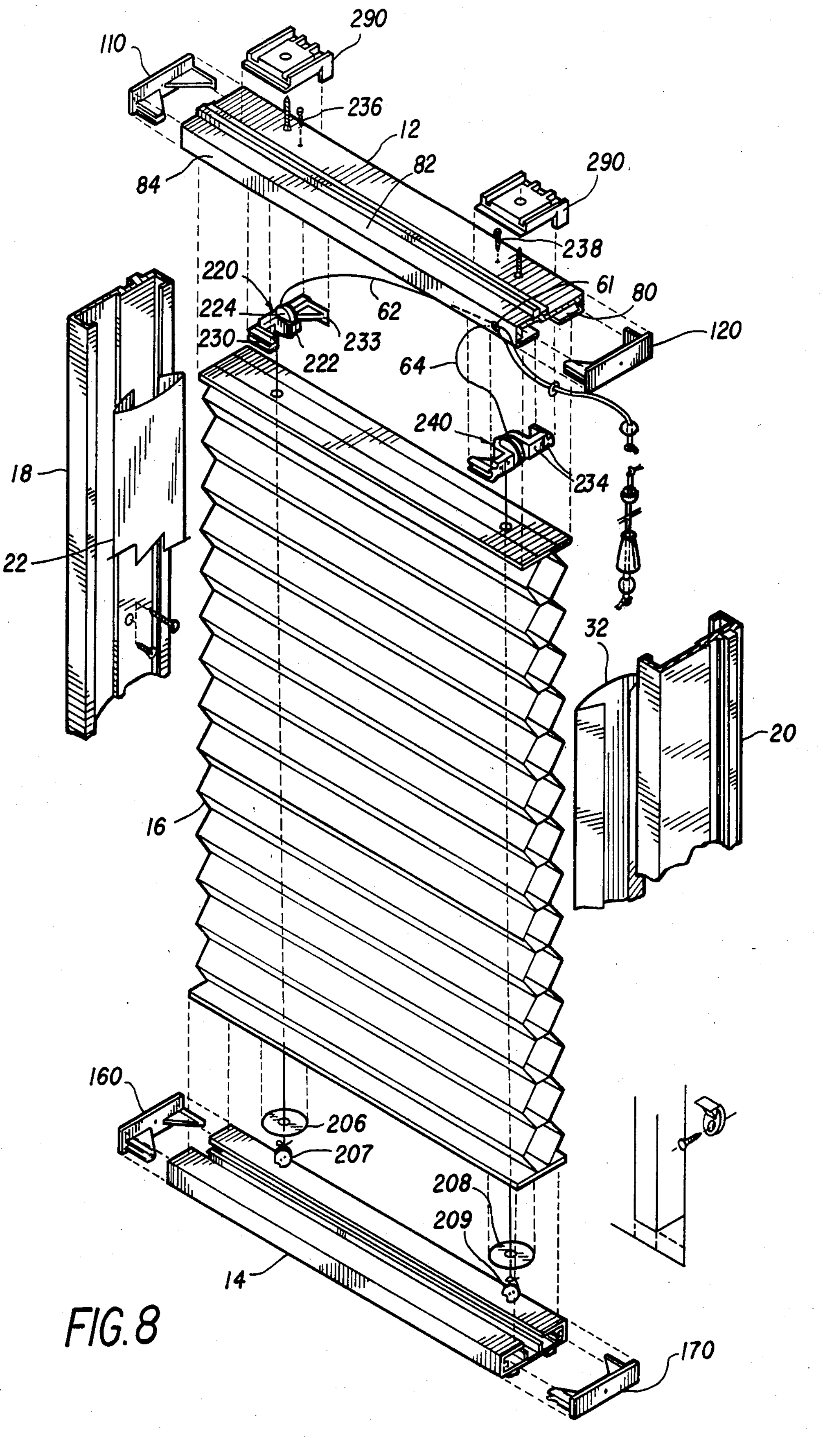
FIG. 8 is an exploded perspective view of another alternate vertical drop embodiment utilizing pulley blocks.

Another variation of the preferred vertical drop embodiment 10 of the present invention is shown in FIGS. 8 and 9. This variation is appropriate particularly where large honeycomb panels 16 are used so that the additional weight causes unacceptable friction and wear on the cords 62. 64. This embodiment includes two pulley blocks 220, 240 in place of the guide plates 200, 202 shown in FIG. 3. For example, left pulley block 220, shown in FIGS. 8 and 9, includes a frame 222 and first and second pulleys 224, 226 mounted on an axle 228. A channel 230 on the front thereof is adapted to engage the rib 100 in head rail 12. Similarly, a rib 232 is adapted to engage the longitudinal channel 102 inside head rail 12. In this manner, the pulley block 220 can be positioned in any appropriate place desired inside the head rail 12 and anchored in that position by a screw 236. Likewise, the right pulley block 240 has similar features and is anchored by screw 238 in a position directly above tne cord holes through the panel 16 to minimize friction or wear therein.

Figure 10:
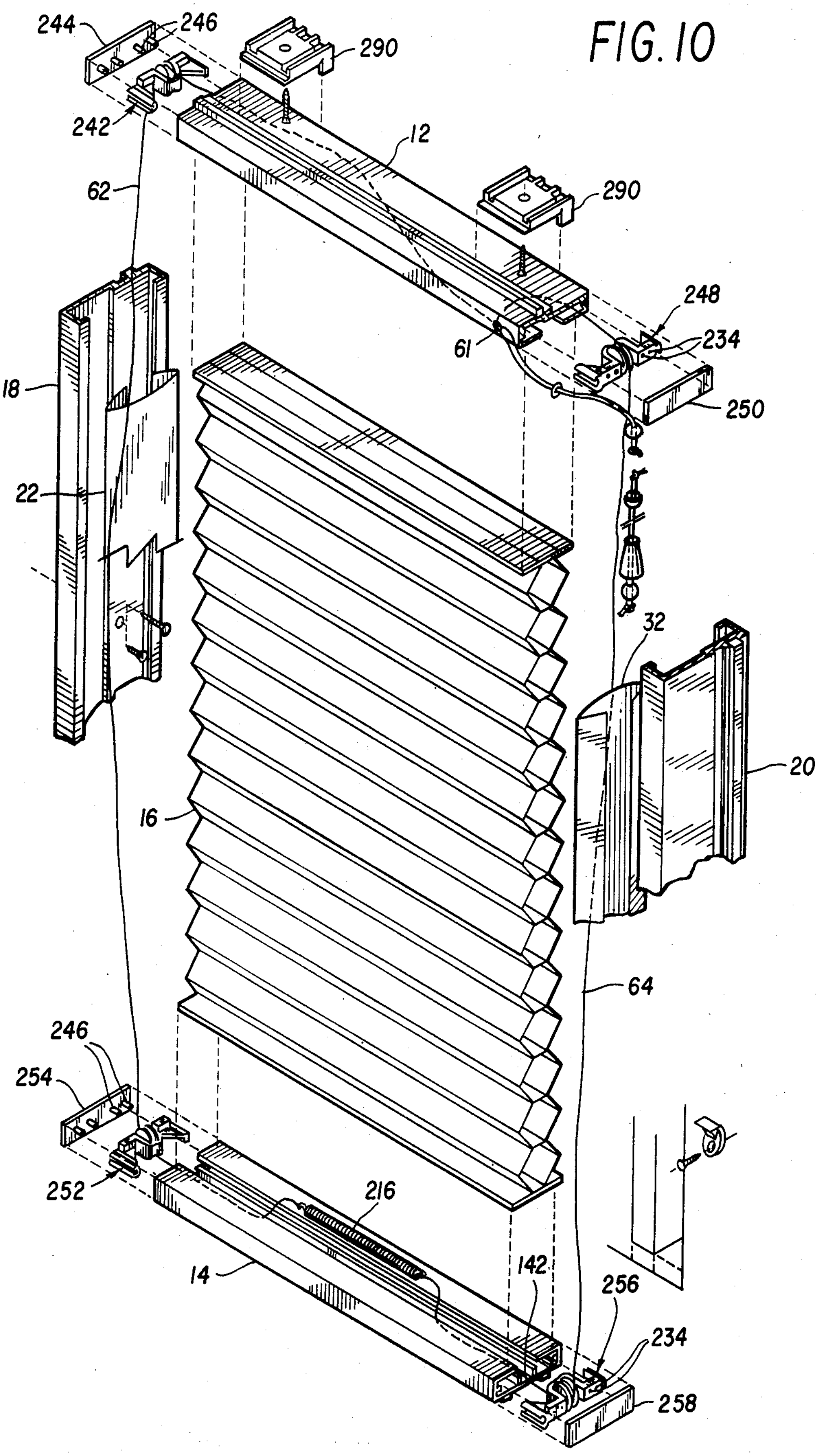
FIG. 10 is an exploded perspective view of the alternate vertical drop system in which the cords are routed through the side tracks and utilizing pulley blocks at the ends of the head rail and sill rail.
Figure 17:
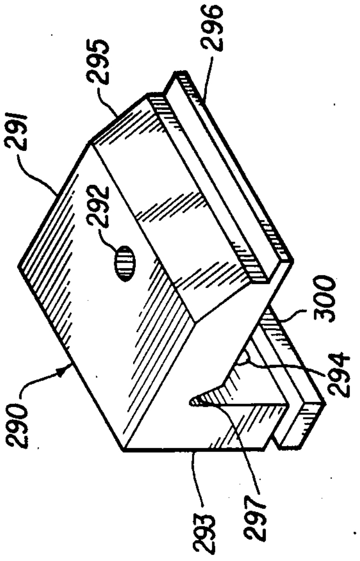
FIG. 17 is a perspective view of the head rail mounting bracket.
Figure 18:
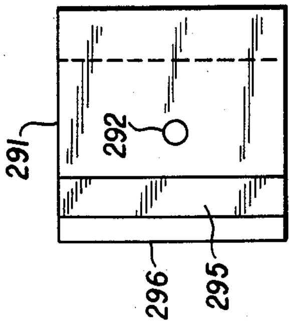
FIG. 18 is a top plan view of the mounting bracket.
Figure 19:
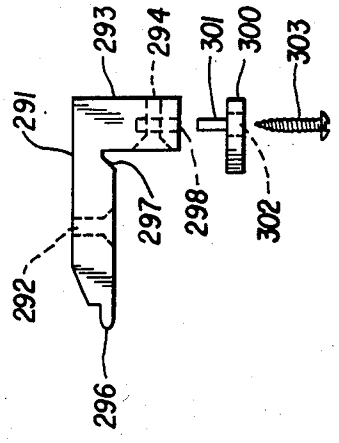
FIG. 19 is a side elevation view of the mounting bracket.
Figure 20:
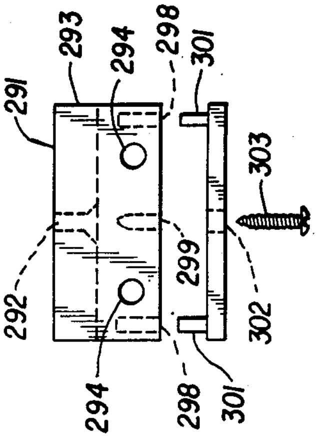
FIG. 20 is a rear elevation view of the mounting bracket.

As shown in FIG. 10, these same pulley blocks can be positioned in the ends of the head rail and in the sill rail for accommodating the exterior cord mounting of left and right cord 62, 64 and the side track 18, 20, respectively. When used in this manner, different end caps 244, 250, 254, and 258 are utilized to close the ends of the head rail 12 and sill rail 14. These end plates 244, 250, 254, 258 have protruding inwardly therefrom a plurality of dowel pins 246 adapted to engage similarly sized and spaced holes 234 in the pulley block frames 222 for securing the end caps in position.

Another variation of the preferred vertical drop embodiment 10 of the present invention is shown in FIGS. 11-16, wherein the eyelet 63 and tie down 78 are replaced by a roller cord lock set 260. This roller cord lock set 260 also reduces friction and cord wear by providing rollers to guide the cords 62, 64 into and out of the head rail 12.

As shown in FIG. 12, this roller cord lock set 260 is comprised of a cylindrical body 262 having an enlarged front frame member 264 around the forward end of the cylindrical portion 262. A square bore 266 extends longitudinally through the body 262 and frame 264. A horizontal lock roller 268 is journaled near front of the bore 266 in the lower part thereof on an axle 269. The lock roller 268 has a plurality of diagonal grooves 270 recessed into its peripheral surface and a circumferential groove 271 recessed into its center. A horizontal wedge roller 272 is positioned a spaced distance above the lock roller 268. Two vertical rollers 274, 276 mounted on respective axles 275, 279 at the rear of the bore 266. These axles 275, 279 are mounted in respective slotted openings 278, 277 in the cylindrical body 262. As best shown in FIGS. 15 and 16, the lock roller axle 269 and wedge roller 272 are positioned in respective holes 281, 280. Also as shown in FIGS. 15 and 16, when the roller cord lock set 260 is positioned in the front flange 84 of head rail 12, the flange 84 retains the axles 269, 272 in position.

The left cord 62 extends inwardly through the bore 266 and between the lock roller 268 and wedge roller 272, rearwardly through the bore 266, and out of the bore around the roller 274. Likewise, the right cord 64 extends into the bore 266 between the lock roller 268 and wedge roller 272 and outwardly through the rear of bore 266 around pulley 276. In normal operation, the cords 62, 64 would track in the center groove 271 of lock roller 268 so that they could pass freely therethrough. However, when it is desired to lock the cords, thus the panel 16, in any position above the window sill, the cords 62, 64 can be moved to the side, whereupon the diagonal grooves 270 guide them out of center groove 271 and into a wedging relationship between the lock roller 268 and wedge roller 272. In this wedged relationship they cannot move and the honeycomb panel 16 will remain in the desired position.

The head rail 14 is mounted to the window frame F or head jamb 70 by a plurality of mounting brackets 290, as shown in FIGS: 17-23. Each mounting bracket 290 has a top section 291 and a rear section 292 extending downwardly at a right angle from the top section 291. The top section 291 tapers forwardly at 295 to a forwardly protruding lip 296. An upwardly protruding groove 297 is formed at the inside junction of the top section 291 and rear section 292. A hole 292 is provided through the top section 291 for screwing the bracket to the head jamb 70. Alternatively, the rear section 293 can be secured to a vertical wall with screws through holes 294.

A tightener plate 300 is positioned under the bottom surface of rear section 293. A plurality of dowels 301 extend upwardly from the tightener plate 300 into holes 298 and the rear section 293. Also, a tightener screw 303 is provided to extend upwardly through a hole 302 in tightener plate 300 and into a hole 292 in rear section 293.

Figure 21:
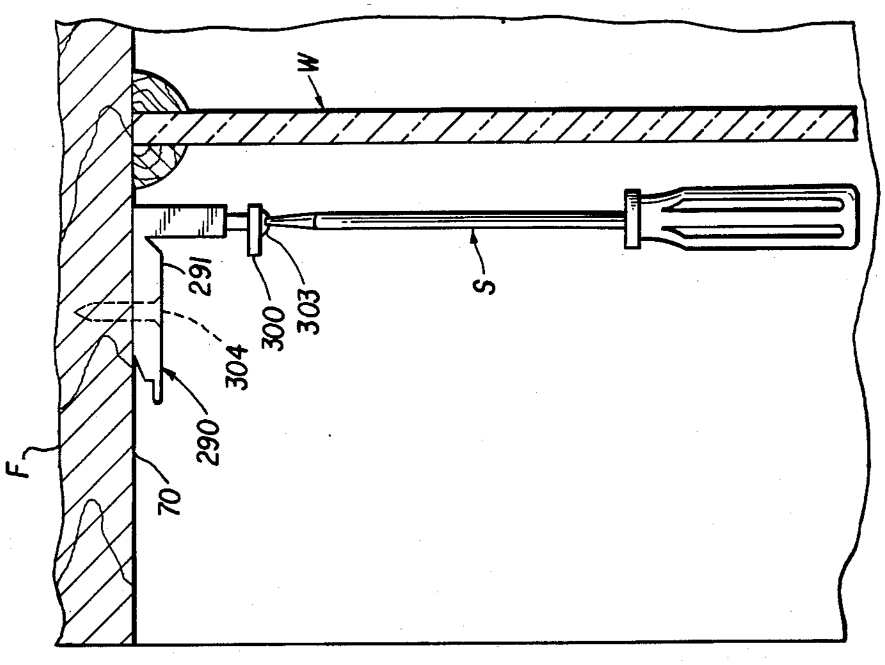
FIG. 21 is a side elevation view of the mounting bracket attached to the top jamb of a window frame.
Figure 23:
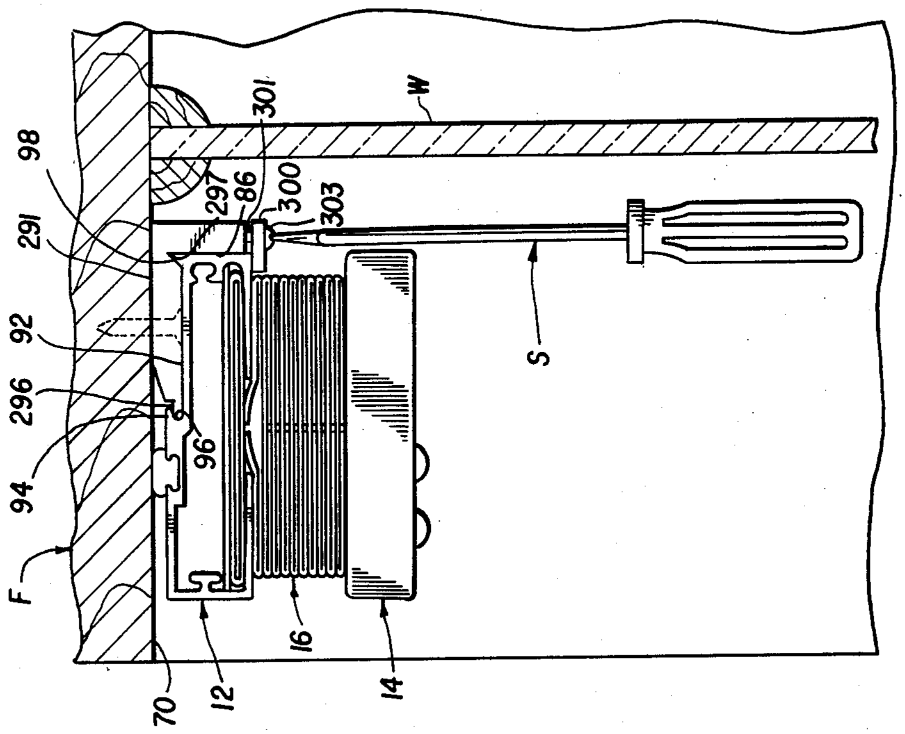
FIG. 23 is a side elevation view of the honeycomb insulation panel according to the present invention fully mounted and secured in the mounting bracket for suspension from the top jamb of a window frame.
Figure 22:
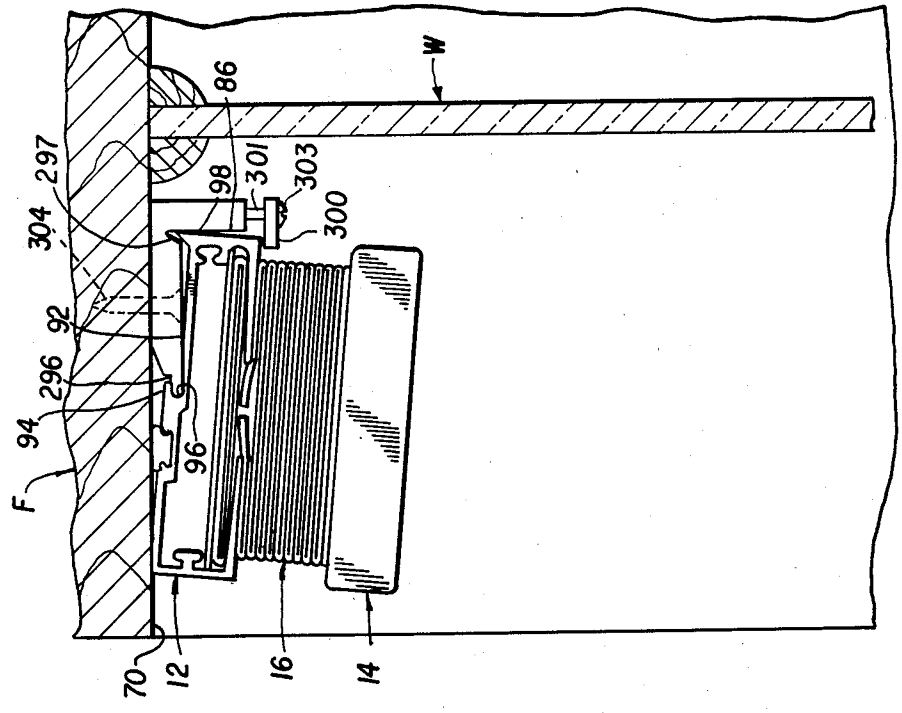
FIG. 22 is a side elevation view of the honeycomb insulation panel of the present invention as it is being inserted into the mounting bracket.

As illustrated in FIG. 21, the mounting bracket 290 is attached to the head jamb 70 by a screw 304. The screw 303 can be adjusted with a screwdriver S outwardly a sufficient distance so that the tightener plate 300 allows the head rail 12 to move into position. As shown in FIG. 22, with the tightener plate 300 properly adjusted, the head rail 12 can be cocked and moved into engagement with the mounting bracket 290 in such a manner that the lip 296 engages the slot 96 and tongue 94 and shoulder 98 engages the groove 297. The head rail 12 can be retained in this position quite easily by this engagement and with the engagement of tightener plate 300 just under the bottom of rear flange 86. Then, a screwdriver S can be easily extended upwardly behind the honeycomb panel 16 and sill rail 14 to tighten the screw 303, thereby tightening tightener plate 300 onto the flange 86 and securing the head rail 12 firmly in place. The dowel pins 301 are effective to retain the tightener plate 300 against twisting or turning with screw 303, thus facilitating easy one-handed tightening of the head rail 12 into firm engagement with the mounting bracket 290, as shown in FIG. 23.

Figure 24:
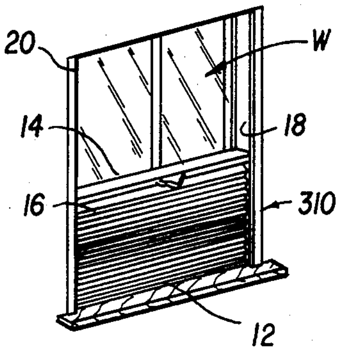
FIG. 24 is a perspective view of an alternate embodiment honeycomb window covering unit according to the present invention with the head rail fastened to the bottom jamb of the window frame and moveable upwardly over the window.
Figure 25:
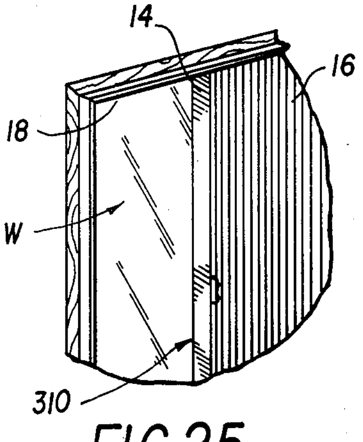
FIG. 25 is a partial perspective view of another alternate embodiment honeycomb window covering unit that is moveable horizontally over the window.

Some installations are not conductive to the preferred vertical drop embodiment 10 described above. For example, in some installations, as shown in FIG. 24, it is desirable to have the honeycomb panel 16 attached to the sill 12 with the moveable end on top so that the panel can be moved upwardly and downwardly from the sill. Also, as shown in FIG. 25, it is sometimes desirable to mount the honeycomb panel 16 for horizontal movement over a window W. Further, some windows are positioned at a non-vertical slant, as shown in FIG. 26.

Figure 26:
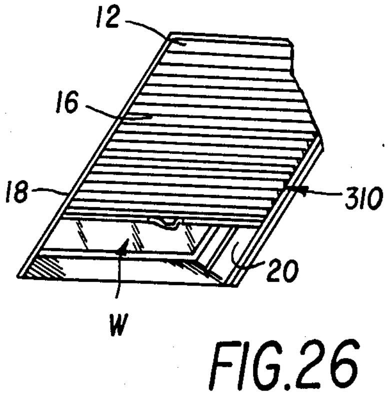
FIG. 26 is another alternate embodiment installation of the honeycomb window covering unit of the present invention on an off-vertical or slanted window or skylight arrangement.
Figure 27:
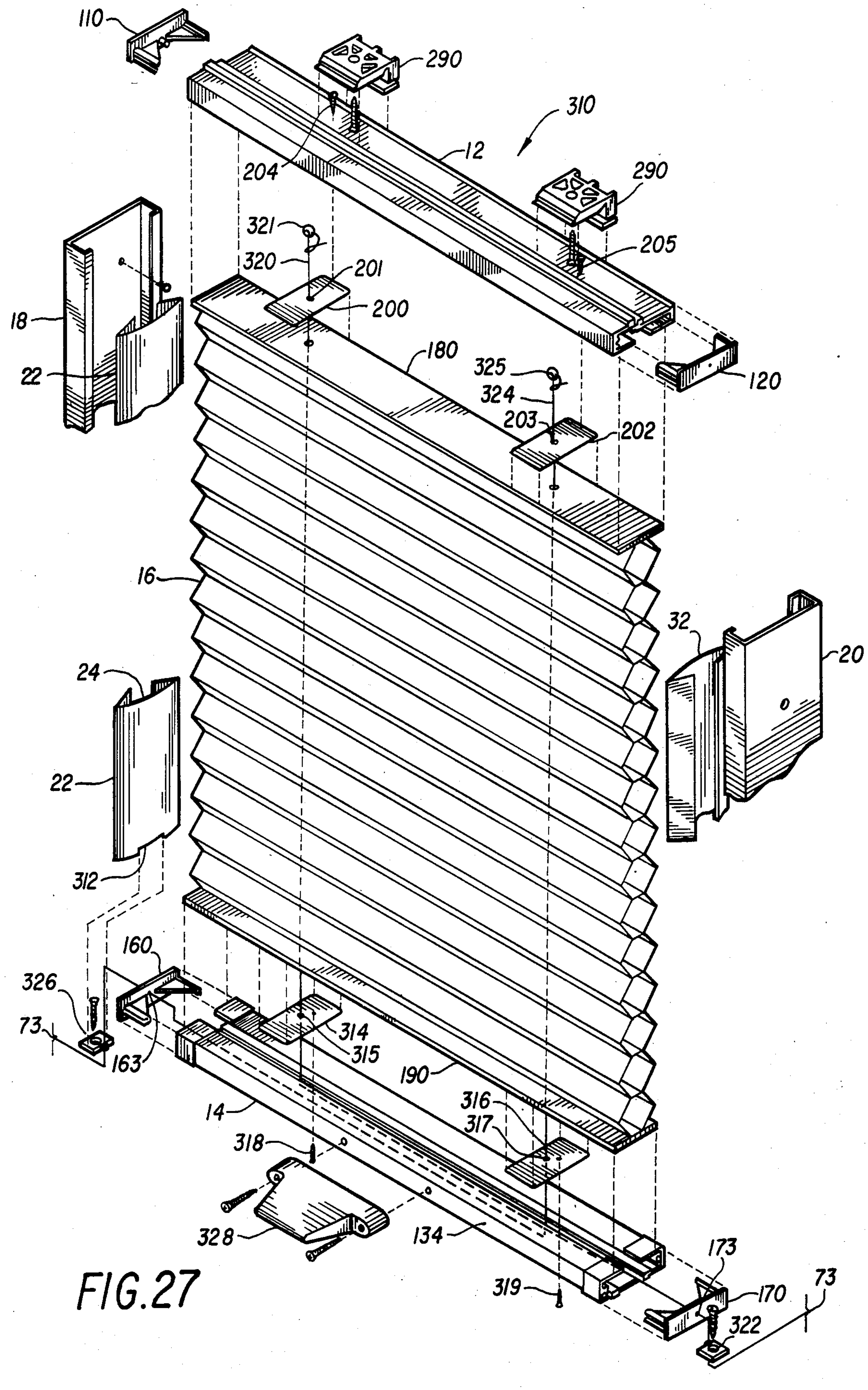
FIG. 27 is an exploded perspective view of an alternate preferred parallel bar system embodiment of the present invention suitable for use in installations such as those shown in FIGS. 24, 25, and 26.

The preferred alternate parallel bar system 310, illustrated in FIG. 27, is appropriate for many non-conventional uses, such as those illustrated in FIGS. 24, 25, and 26. As shown in FIG. 27, this parallel bar embodiment is quite similar to the preferred vertical drop system 10 described above. It has a head rail 12, attached to a window jamb by mounting brackets 290. The expandable honeycomb panel 16 is attached to the head rail 12 in the same manner as that described for the preferred embodiment 10 described above. Also, a moveable sill rail 14 is attached to the other end of the honeycomb panel 16 as described in the preferred vertical drop embodiment 10, above. Also, the side tracks 18, 20 and edge seal elements 22, 32 are the same as those described in the preferred vartical drop embodiment 10, above.

However, rather than utilizing a pull cord 60, as described above, this parallel bar system embodiment 310 utilizes two independent cords 320, 324 anchored at the top to head rail 12 and at the bottom to opposite sides of the window sill 73. More specifically, left cord 320 is anchored at the top by a bead or knot 321 to guide plate 200. Guide plate 200 is fastened to the head rail 12 by a screw 204, as described in the preferred vertical drop embodiment 10 above. Left cord 320 extends downwardly through the panel 16 and through a second guide plate 314 and into the interior of sill rail 14. Guide plate 314 is held in position by screw 318. From guide plate 314, the left cord 320 passes through the interior of sill rail 14 and out hole 173 and right end cap 170. Outside end cap 170, the left cord 320 is anchored to the window sill 73 by an anchor member 322.

The right cord 324 is anchored at the top to right guide plate 202 which is attended to head rail 12 by screw 205. It extends downwardly through panel 16 and into sill rail 14 through a hole 317 in a lower guide plate 316 attached to sill rail 14 by a screw 319. At that point, right cord 324 passes to the left through the interior of sill rail 14 and out hole 163 and left end plate 160. Outside end plate 160, the right cord 324 is anchored to the left side of window sill 173 by anchor member 326. The bottom of web 24 has notch 312 therein to slip over the anchor member 326 without interfering with the functioning of edge seal element 22.

A handle 328 is attached to the front flange 134 of sill rail 14 for moving sill rail 14 upwardly and downwardly within the side tracks 18, 20. Because of the arrangement and positioning of the left and right cords 320, 324 with their respective anchors at opposite sides of sill rail 14, sill rail 14 can be moved easily upwardly and downwardly within the guide tracks 18, 20. However, this arrangement also always maintains the sill rail 14 in parallel relation to the head rail 12, thereby keeping the entire panel system in proper alignment within the tracks 18, 20. Also, this arrangement provides just the friction in the cords to keep the sill rail 14 at any position desired by the user between the window sill 73 and the head rail 12. It can also be appreciated that the pulley blocks 220, described above and shown in FIGS. 8 and 9, could be used in place of the guide plates 314, 316 in this embodiment of excessive friction or cord wear is encountered, particularly in large installations.

Figure 28:
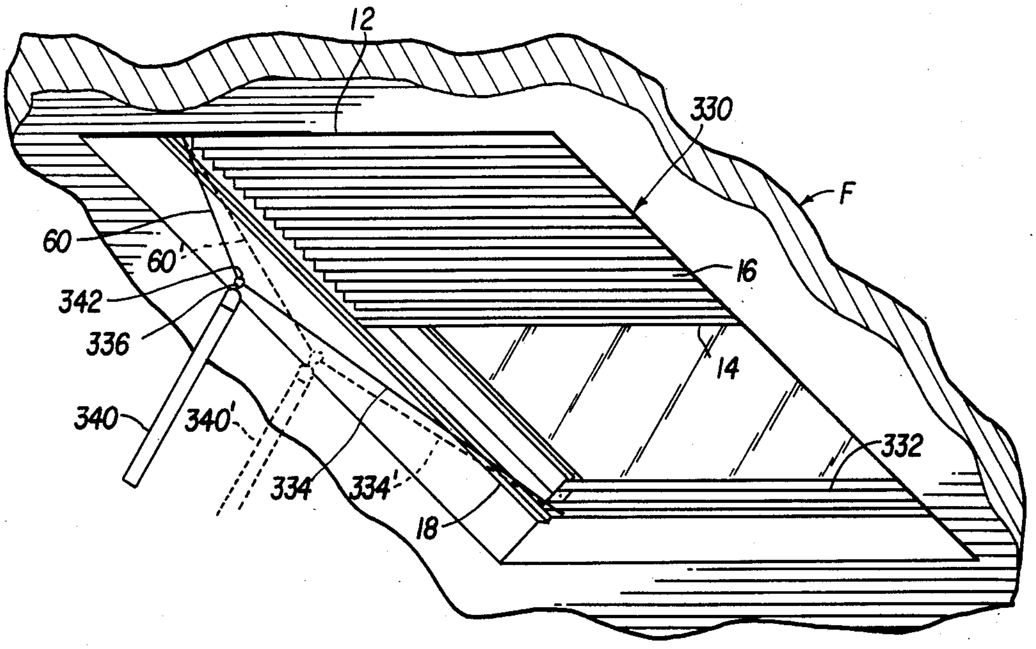
FIG. 28 is a perspective view of another preferred alternate continuous loop system honeycomb window covering unit mounted in a horizontal ceiling skylight installation.
Figure 31:
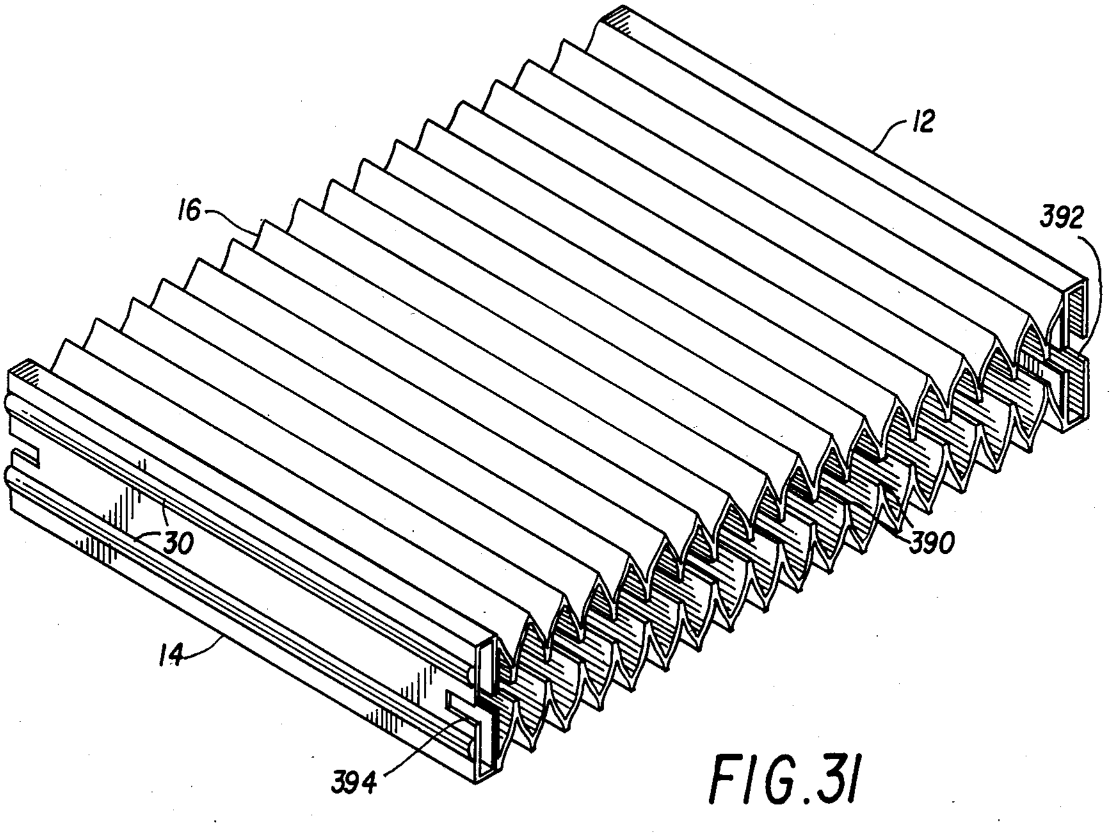
FIG. 31 is a perspective view of the honeycomb insulation panel with the notched end bearings therein for use in the notched bearing edge track embodiment shown in FIG. 30.
Figure 29:
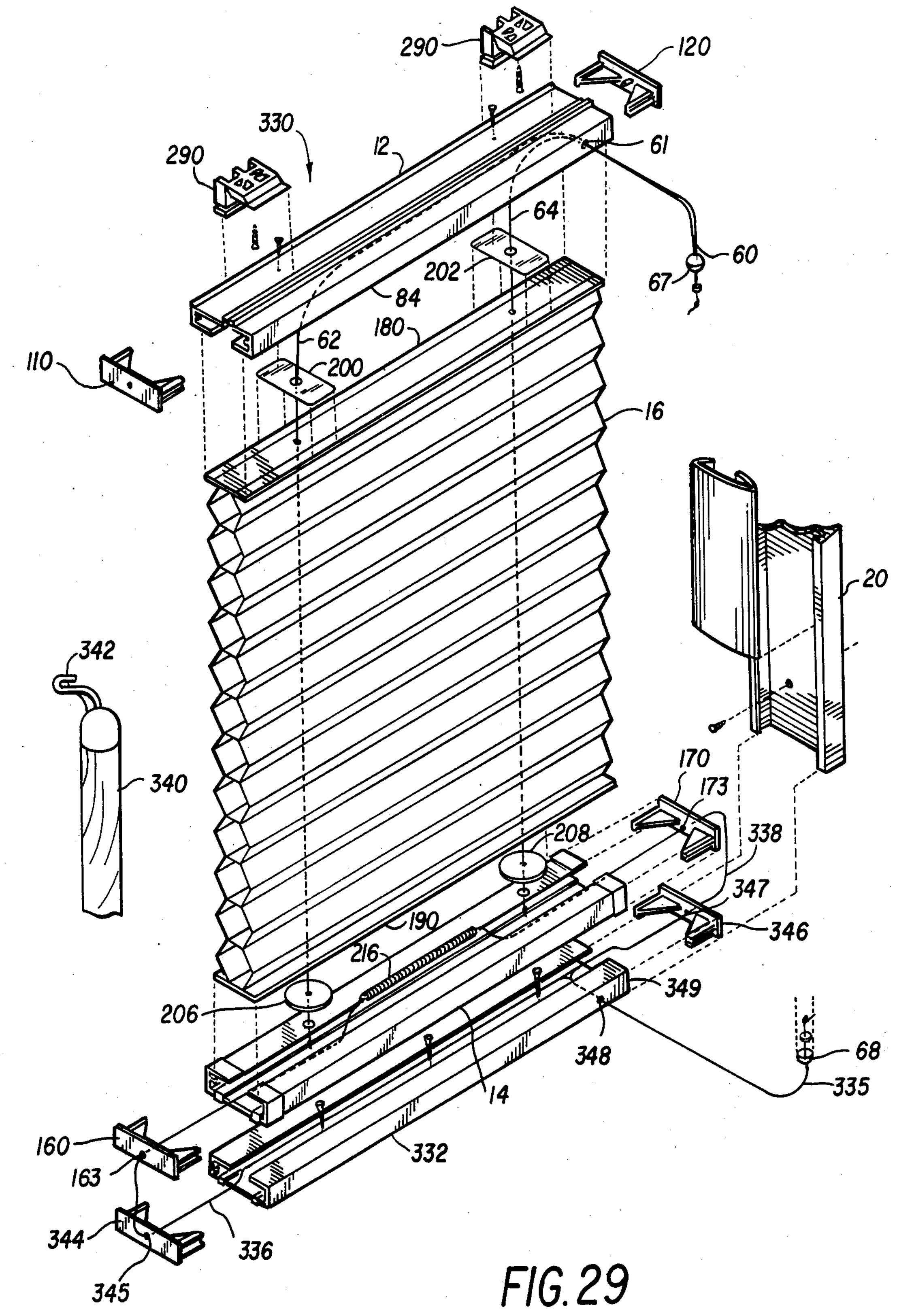
FIG. 29 is an exploded perspective view of the alternate embodiment continuous loop system honeycomb window covering unit of the present invention.
Figure 30:
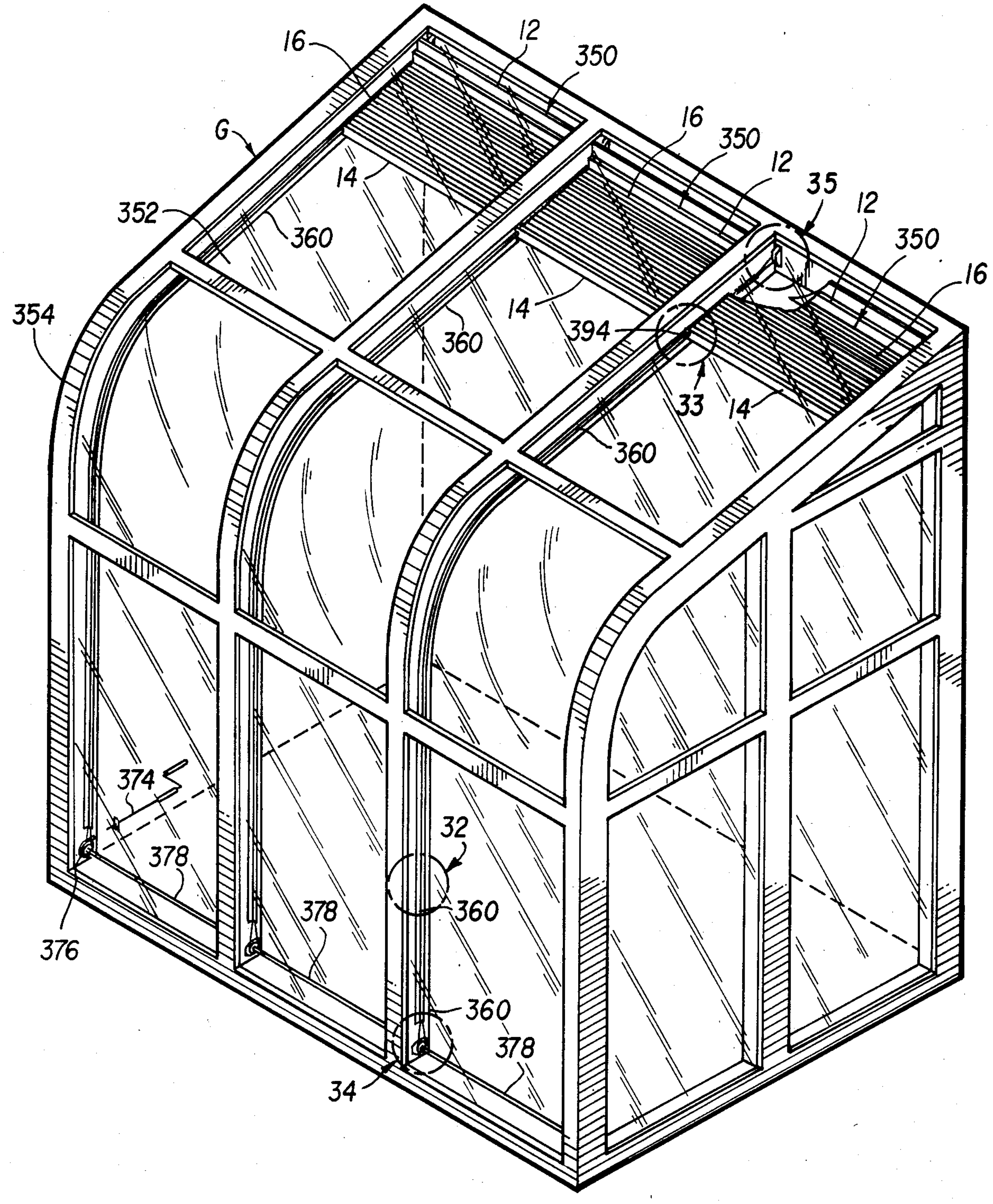
FIG. 30 is a perspective view of another alternate embodiment notched bearing edge track embodiment suitable for non-vertical curved surface installations such as the green house shown therein.
Figure 35:
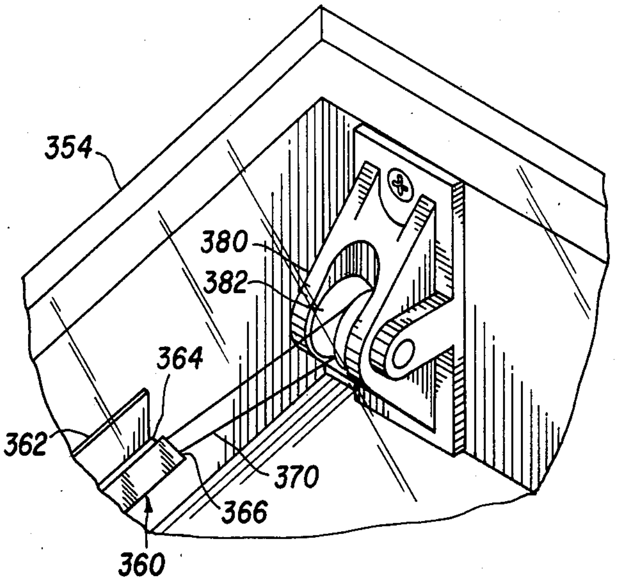
FIG. 35 is an enlarged perspective view of the top idler pulley of the embodiment shown in FIG. 30.

Another alternate preferred embodiment in the form of a continuous loop system 330 can also be used for the non-conventional installations in which the preferred vertical drop system 10, described above, are not appropriate. Such an installation in a skylight is shown in FIG. 28, wherein the continuous loop honeycomb panel system 330, according to the present invention, is mounted in a horizontal overhead position. This alternate preferred embodiment continuous loop system is best described in reference to FIGS. 28 and 29. In this continuous loop system, a head rail 12 is fastened by brackets 290 to a window frame, as described in the preferred embodiments above. The honeycomb panel 16 is also attached to the head rail 12, as described above. Further, a moveable sill rail 14 is attached to the opposite end of the honeycomb panel 16, again, as described in the preferred embodiments above. This part of the arrangement is virtually the same as the vertical drop embodiment 10, described above and illustrated in FIG. 3.

In this continuous loop system embodiment 330, however, a secondary sill rail 332 is permanently attached to the sill or frame of the window adjacent the main sill rail 14. A reverse operating cord 335, comprised of a left cord 336 and a right cord 338, extends through a hole 348 into the interior of secondary sill rail 332. The left cord 336 passes out the left end through hole 345 in end plate 344 and upwardly to the left end of main sill rail 14. It passes through hole 163 and end plate 160 into the interior of main sill rail 14 and is anchored or terminated therein at a tension spring 216. Likewise, the right cord 338 passes out the right end of secondary sill rail 332 through a hole 347 and end plate 346. It then passes upwardly and into the right end of the main sill rail 14 through hole 173 in right end plate 170. Inside sill rail 14, the right cord 338 also anchors or terminates at the tension spring 216. The outer end of reverse operating cord 335 is joined by a joiner ball comprised of an upper section 67 and a lower section 68 together with the forward operating cord 60.

In operation, when cord 60 is pulled out, it will pull main sill rail 14 upwardly in the conventional manner. As main sill rail 14 moves upwardly, it will pull reverse operating cord 335 into the secondary sill rail 332. Then, when it is desired to move the main sill rail 14 downwardly, the reverse operating cord 335 can be pulled out of secondary sill rail 332. This outward pull on reverse operating cord 335 will move main sill rail 14 downwardly, thus pulling operating cord 16 into the head rail 12. The tension spring 216 maintains the cords in proper tension and alignment so that no loose ends or unparallel actions occurs.

When the honeycomb panel installation 330 is positioned out of reach, such as in an overhead skylight shown in FIG. 28, a pole 340 with a hook 342 on the end thereof can be used to engage the joiner ball to pull the cords back and forth, thereby moving the honeycomb panel 16 one way and then the other.

Figure 32:
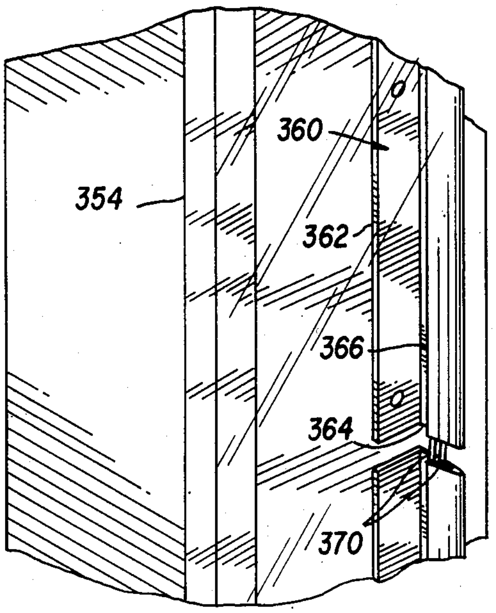
FIG. 32 is an enlarged perspective view of the edge track of the embodiment shown in FIG. 30.
Figure 33:
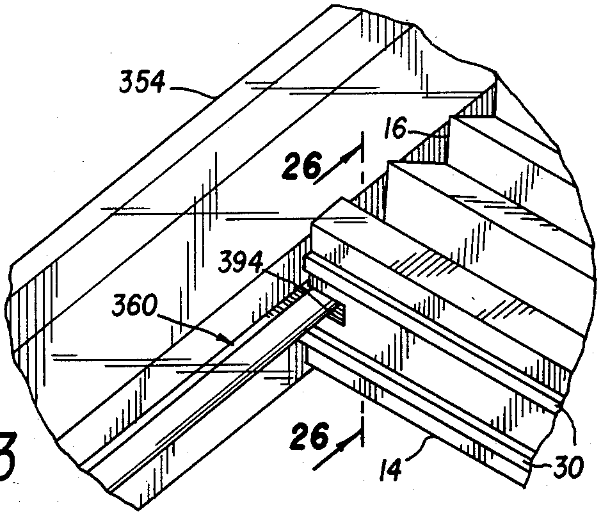
FIG. 33 is an enlarged perspective view of the notched opening in the sill rail of the embodiment shown in FIG. 30.

Another alternate embodiment 350 of the present invention, preferred for use in non-vertical curved surface or curved track applications is illustrated in FIGS. 30–35. Such applications are typical in green house installations, such as that illustrated in FIG. 30, wherein the panel is stretched through a non-vertical section around a curve and into a vertical section. In this notched-bearing, edge track embodiment 350, which is designed for optimum tracking through curves, the edges of the honeycomb cells are notched as shown at 390 in FIG. 31. Each notch 390 provides a bearing surface for that particular tubular cell. Corresponding notches 392, 394 are provided in the head rail 12 and sill rail 14, respectively. As best shown in FIGS. 32 and 33, the edge track 360 is comprised of a web 364 extending outwardly from the frame 354 of the green house installation G. This edge track 360 extends into the notched bearings 390 in the honeycomb panel 16. When edge tracks 360 are engaged with notched bearing 390 on both sides of the honeycomb panel 16, the sill rail 14 can be pulled along the edge tracks 360, including around curves, and the honeycomb panel 16 will follow meticulously and smoothly.

Figure 36:
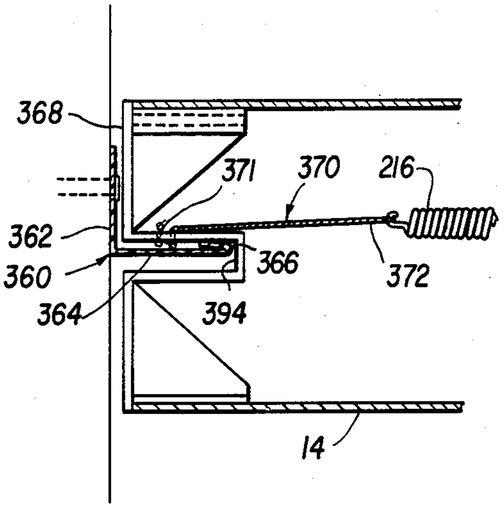
FIG. 36 is a cross-sectional view of the sill rail and edge track taken along lines 36—36 in FIG. 33.
Figure 34:
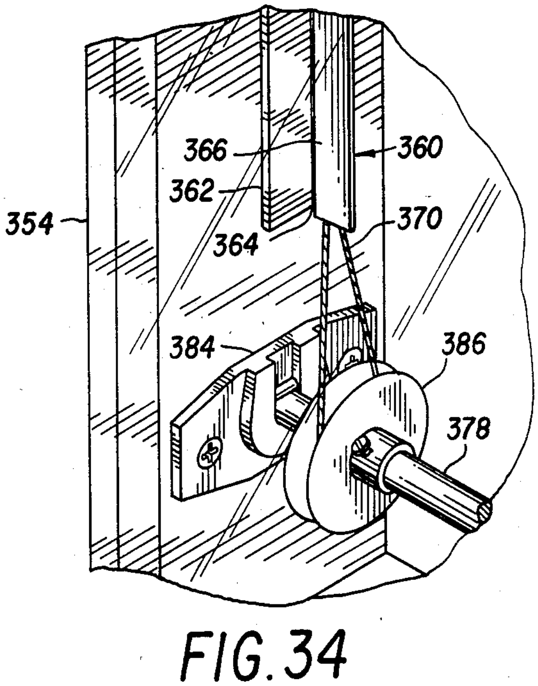
FIG. 34 is an enlarged perspective view of a drive pulley for the embodiment shown in FIG. 30.

A drive system for this kind of installation is also illustrated in FIG. 30 and FIGS. 32–35. A drive shaft 378 is positioned horizontally along the bottom of the green house panels. A crank 374 and corresponding gear drive 376 are used to turn the shaft 378. As illustrated in FIGS. 32, 33, and 34, the edge track 360 is comprised of a flange 362 attached to the green house frame 354. A web 364 extends upwardly from the flange 362 into engagement with the notched edge bearings 390 of the honeycomb panel 16. The distal end of the web 364 is returned in a lip a partial distance toward the flange 362, thereby creating a space or channel between the lip 366 and web 364. A continuous cord passing around a drive pulley 386 mounted on drive shaft 378 passes upwardly through the channel in the edge track 360 to the top of the green house. At the top of the green house, the cord 370 passes around a idler pulley 382 and a pulley block 380 fastened to the upper end of the green house frame 354. A similar installation of drive pulleys and a drive cord is installed on the opposite side of the honeycomb panel 16. As shown in FIG. 36, the cord 370 is anchored at one end 371 to the sill rail 14 and at the opposite end 372 to a tension spring 216. Therefore, when the shaft 378 is turned, the pulley 386 drives the cord 370 to pull the sill rail 14 upwardly or downwardly along the edge track 360. The tension spring 216 maintains the cord 370 and the corresponding cord on the opposite side of honeycomb panel 16 in proper tension and alignment for smooth movement upwardly and downwardly over the curved surface.

Figure 37:
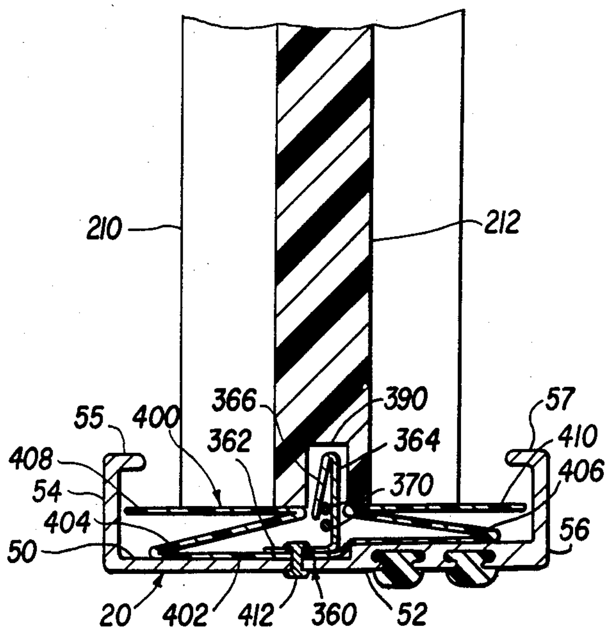
FIG. 37 is a cross-sectional view of an alternate edge seal embodiment adapted for use with the notched bearing edge track embodiment shown in FIG. 30.

If edge seals are desired for maximizing thermal insulation of the honeycomb panel 16, such edge seals can be provided, as shown in FIG. 37. In this illustration, an edge seal element 400 is anchored by a rivet 412 under the edge track 360. It includes a web 402, a front leg 404 and a rear leg 406 extending from the outer edges of the web 402 to respective front and rear face panels 408, 410. The face panels 408, 410 provide a sliding seal for the open ends of the honeycomb cells 210, and the resilient bias legs 404, 406 bias the face panels 408, 410 against the edges of panels 210. Edge seal element 400 can be provided in an optional side track channel 20, if desired, although the side track channel is not necessary when the edge track 360 is used.

Figure 38:
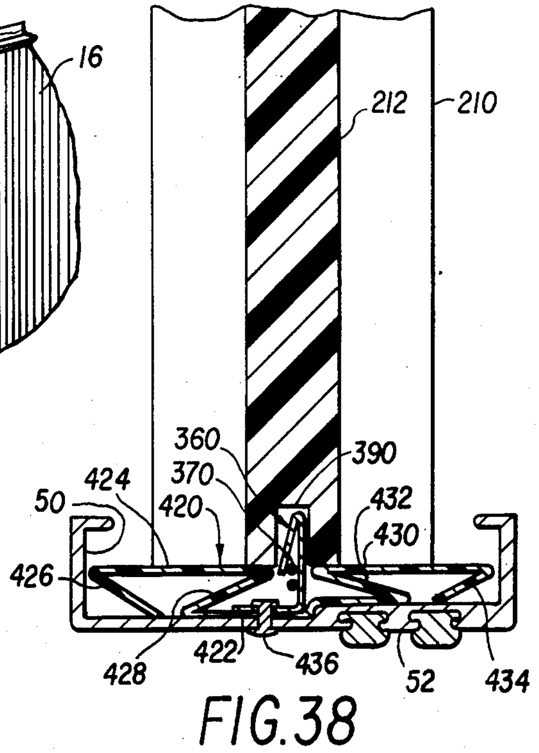
FIG. 38 is a cross-sectional view of another edge seal embodiment for use with the notched bearing edge track embodiment shown in FIG. 30.

An alternate embodiment of edge seal 420 is shown in FIG. 38. It is similar to the embodiment shown in FIG. 37 but it has a web portion 422 anchored under the edge track 360 by a rivet 436 with resilient biased legs 428, 432 attached to face panels 424, 430. As in the embodiment described above in FIG. 37, the resilient legs 428, 432 tend to bias the face panels 424, 430 against the open ends of the tubular cells 210 of honeycomb panel 16. In this embodiment, however, there is also added a set of secondary legs 426, 434 to bias the outer ends of the face panels 424, 430 against the honeycomb panel cells to maintain a more positive seal at the outer edges thereof.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. In an expandable honeycomb insulation panel having a plurality of elongated tubular parallel cell structures stacked and fastened together to form the panel, the improvement comprising:

two parallel elongated members positioned apart from each other a spaced distance less than the width of the cell structures, and extending parallel to the length thereof with one of said cell structures positioned on the opposite side of said parallel members from the next adjacent cell structure.

2. The improvement of claim 1, including stiffener means positioned in said one cell structure for preventing said one cell structure from collapsing and moving through the space between said parallel members.

3. The improvement of claim 2, wherein said stiffener means is an elongated rigid member inserted longitudinally in said one cell structure, which rigid member is wider than the distance between said parallel members.

4. In an expandable honeycomb insulation panel having a plurality of elongated tubular parallel cell structures stacked and fastened together to form the panel, the improvement comprising:

two parallel elongated members positioned apart from each other a spaced distance less than the width of the cell structures, with one of said cell structures positioned on the opposite side of said parallel members from the next adjacent cell structure;

stiffener positioned in said one cell structure for preventing said one cell structure from collapsing and moving through the space between said parallel members; and an elongated head rail in the shape of a channel, said parallel members being formed by a pair of lips protruding inwardly toward each other from the distal ends of the channel flanges, and said one cell structure and said stiffener means being positioned in said channel.

5. The improvement of claim 4, including a recessed portion on the outer surface of the channel web with a longitudinal tongue portion overlapping a part of said recessed portion, and mounting bracket means for engaging said overlapping tongue and fastening said head rail to a building structure, wherein said mounting bracket means includes tightener means for engaging the rear flange of said channel adjacent said panel, and wherein said tightener means includes an elongated flat plate fastened by screw to said mounting bracket means and a restraining means for restraining said flat plate from turning with the screw as the screw is tightened.

6. The improvement of claim 5, wherein said restraining means includes a dowel pin offset from said screw and protruding upwardly into engagement with said mounting bracket means.

7. The improvement of claim 4, including an elongated retainer rib protruding inwardly from one flange of the channel and a retainer channel on the inside surface of the second flange of the channel, both said retainer rib and said retainer channel extending longitudinally on their respective flanges the entire length of the channel.

8. The improvement of claim 4, including end closure means for enclosing the end of said channel, said end closure means having a mounting rib thereon sized and shaped to mate with said retainer channel and a mounting channel sized and shaped to mate with said retainer rib for securing said closure means to said channel.

9. The improvement of claim 4, including pulley means for guiding cords into and out of said channel, said pulley means having a mounting rib thereon sized and shaped to mate with said retainer channel and a mounting channel sized and shaped to mate with said retainer rib for mounting said pulley means in said channel.

10. The improvement of claim 1, including moveable cell support means at the opposite end of said panel from said parallel members for collapsing and expanding said honeycomb panel.

11. The improvement of claim 10, including motion producing means connected to said moveable cell support means for moving said moveable cell support means toward and away from said parallel members.

12. The improvement of claim 11, wherein said motion producing means includes a flexible cord with one end anchored to said moveable cell support means and the other end extending toward said parallel members to a position beyond said panel and being releaseably anchored in fixed relation to said parallel members.

13. The improvement of claim 12, wherein said cord extends through said panel toward said parallel members.

14. The improvement of claim 13, including a first flexible cord and a second flexible cord with respective first ends of said first and second cords being anchored in spaced apart relation to each other to said moveable cell support means and the respective opposite ends of said first and second cords extending through said panel in parallel spaced apart relations to each other toward said parallel members to a position beyond said panel.

15. The improvement of claim 14, including third cord anchor means positioned beyond said moveable cell support means in a direction opposite said parallel members and in fixed spacial relation to said parallel members, and a third cord with its first end anchored to said moveable cell support means and the opposite end of which is passed slideably around said third cord anchor means and returned to a connection with said opposite ends of said first and second cords.

16. The improvement of claim 15, wherein said third cord anchor means is an elongated rigid channel positioned parallel to said moveable cell support means and on the side thereof opposite said parallel members and in a fixed spacial relation to said parallel members, third and fourth cords, the respective first ends of which are anchored to said moveable cell support means in spaced apart relation to each other with the respective opposite ends thereof extending to respectively adjacent ends of said elongated rigid channel and extending together to a connection with said opposite ends of said first and second cords.

17. The improvement of claim 16, including spring tension means in said moveable cell support means for anchoring said third and fourth cords to each other and to said moveable cell support means.

18. The improvement of claim 12, wherein said cord extends adjacent said panel from said moveable cell support means toward said parallel members.

19. The improvement of claim 18, including first and second flexible cords, the first ends of which are anchored to said moveable cell support means in spaced apart relation to each other and the opposite ends of which extend adjacent respective opposite edges of said panel toward said parallel members.

20. The improvement of claim 10, including a first cord, the first end of which is anchored in fixed relation to said parallel members and the opposite end of which extends adjacent the left lateral edge of said panel to the left side of said moveable cell support means and then to the right side thereof where it is anchored in fixed spacial relation to said parallel members, and a second cord, the first end of which is anchored in fixed relation to said parallel members and the opposite end of which extends adjacent the right lateral edge of said panel to the right side of said moveable cell support means and then to the left side thereof where it is anchored in fixed spacial relation to said parallel members.

21. In an expandable honeycomb insulation panel having a plurality of elongated tubular parallel cell structures stacked together to form the panel with the lateral edges of said panel formed of open ends of said cell structures, the improvement comprising edge seal means for closing and sealing the open ends of said cell structures, said edge seal means including an elongated strip positioned adjacent the lateral edge of the honeycomb panel along substantially the entire length of said panel and bias means connected to said strip for biasing said strip into sliding contact with the lateral edge of said panel.

22. The improvement of claim 21, including side track means for engaging and maintaining proper lateral and transverse alignment of said panel as defined by the path of the side track means while allowing longitudinal movement of said panel within said side track means.

23. The improvement of claim 22, wherein said side track means includes an elongated channel with the lateral edge of said panel inserted partially therein, said channel including a pair of lips extending inwardly toward each other from the distal ends of opposite flanges of the channel, and said elongated strip being positioned in said channel between the lateral edge of said panel and the web of said channel, said strip being wider than the opening between said lips.

24. The improvement of claim 23, wherein said bias means includes a pair of leg portions extending rearwardly from opposite sides of said strip into contact with the web of said channel, said legs and the juncture of said legs to said strip being resilient and deformed from their normal position.

25. In an expandable honeycomb insulation panel having a plurality of elongated tubular parallel cell structures stacked together to form the panel, the improvement comprising:

notched bearing surfaces extending into the ends of said cell structures that form the lateral edges of said panel; and edge track means positioned adjacent said lateral edges of said panel for defining the path of said panel and retaining said panel in the path, said edge track means including an elongated rib protruding into said notched bearing surfaces in said panel.

26. The improvement of claim 25, including moveable cell structure support means attached to and supporting a moveable end of said panel for pulling and pushing said panel over the path defined by said edge track, and drive means connected to said moveable cell structure support means for moving said moveable cell structure and support means through said path.

27. The improvement of claim 26, wherein said drive means includes a flexible cord attached to said moveable cell structure support means, and said edge track means includes a flange and a web extending from said flange into said notched bearing surfaces of said panel, the distal end of said web having its distal edge returned toward the flange forming a channel in the web, said web and said returned portion forming said elongated rib, and said cord being positioned in said channel.

28. The improvement of claim 27, wherein said drive means includes a drive pulley at one end of said edge track and an idler pulley at the opposite end of the edge track and a continuous cord looped around said drive and idler pulleys and extending through said channel in said edge track, said cord also being attached at one place to said moveable cell structure support means.

29. The improvement of claim 28, wherein said drive means includes a tension spring attached to said cord in said moveable cell structure support means.

30. The improvement of claim 25, wherein said edge track means includes edge seal means fastened to said elongated rib for closing and sealing the ends of said tubular cell structures.

31. The improvement of claim 30, wherein said edge seal means includes a resilient strip having a web attached to and extending to both sides of said elongated rib, a pair of legs extending from opposite edges of said web toward said panel and connected adjacent said panel to a face panel biased by said legs against said panel.

32. The improvement of claim 31, wherein said edge seal also includes an elongated channel extending along the lateral edge of said panel with said elongated rib and said edge seal means being in said channel, and said edge seal also includes an additional pair of resilient legs extending from the distal ends of said face panels into contact with the web of said channel to bias the distal ends of said face panels against said lateral edge of said panel.

33. In an expandable and retractable cellular insulation comprising a plurality of elongated tubular parallel cell structures stacked and fastened together forming a panel, the improvement comprising:

a rigid support member connected to substantially the full length of one end of said panel running parallel with the cell structures;

a rigid movable cell support means at the opposite end of said panel parallel with said support member for expanding and retracting said panel; and motion producing means connected to said movable support means for moving said support means toward and away from said support member, said motion producing means including;

a first flexible cord and a second flexible cord with respective first ends of said first and second cords being anchored in spaced apart relation to each other to said movable support means and the respective opposite ends of said first and second cords extending through said panel in parallel spaced apart relation to each other toward said support member to a position beyond said panel;

third cord anchor means positioned beyond said movable support means in a direction opposite said support member and in fixed spacial relation to said support member; and a third cord with its first end anchored to said movable support means and the opposite end of which is passed slideably around said third cord anchor means and returned to a connection with said opposite ends of said first and second cords.

34. The improvement of claim 33, wherein said third cord anchor means is an elongated rigid channel positioned parallel to said movable support means and on the side thereof opposite said support member and in a fixed special relation to said support member, and a fourth cord, the respective first ends of said third and fourth cords being anchored to said movable support means in spaced apart relation to each other with the respective opposite ends thereof extending to respectively adjacent ends of said rigid support member and extending together to a connection with said opposite ends of said first and second cords.

35. The improvement of claim 34, including spring tension means in said movable support means for anchoring said third and fourth cords to each other and to said movable support means.

36. In an expandable and retractable cellular insulation comprising a plurality of elongated tubular parallel cell structures stacked and fastened together forming a panel, the improvement comprising:

a rigid support member connected to substantially the full length of one end of said panel running parallel with the cell structures;

a rigid movable cell support means at the opposite end of said panel parallel with said support member for expanding and retracting said panel;

a first cord, the first end of which is anchored in fixed relation to said support member and the opposite end of which extends adjacent the left lateral edge of said panel to the left side of said movable support means and then to the right side thereof where it is anchored in fixed spacial relation to said parallel members; and a second cord, the first end of which is anchored in fixed relation to said support member and the opposite end of which extends adjacent the right lateral edge of said panel to the right side of said movable support means and then to the left side thereof where it is anchored in fixed spacial relation to said support member.

* * * * *

US004647488B1

REEXAMINATION CERTIFICATE (2445th)

United States Patent [19] [11] B1 4,647,488

[45] Certificate Issued Dec. 27, 1994

Schnebly et al.

[54] METHOD AND APPARATUS FOR MOUNTING AND SEALING HONEYCOMB INSULATION

[75] Inventors: John T. Schnebly, Boulder; Richard S. Steele, Broomfield; Wendell B. Colson, Boulder, all of Colo.

[73] Assignee: Hunter Douglas, Inc., Maywood, N.J.

Reexamination Request:
No. 90/002,469, Oct. 8, 1991

Reexamination Certificate for:

| | |
|---|---|
| Patent No.: | **4,647,488** |
| Issued: | **Mar. 3, 1987** |
| Appl. No.: | **638,860** |
| Filed: | **Aug. 7, 1984** |

[51] Int. Cl.[5] .......... B32B 3/12
[52] U.S. Cl. .......... 428/116; 160/84.1 D; 160/84.1 E; 160/84.1 R; 160/107
[58] Field of Search .......... 156/197; 160/84.1, 107, 160/84.1 D, 84.1 E, 84.1 R; 428/116, 12, 118, 181

[56] References Cited

U.S. PATENT DOCUMENTS

| | | | |
|---|---|---|---|
| Re. 30,254 | 4/1980 | Rasmussen | 160/84.1 |
| Re. 31,129 | 1/1983 | Rasmussen | 156/193 |
| 2,020,639 | 11/1935 | Grayson | 428/117 X |
| 3,025,964 | 3/1962 | Summers | 210/493.5 |
| 3,064,724 | 11/1962 | Nowell | 160/330 |
| 3,074,839 | 1/1963 | May | 156/197 |
| 3,077,223 | 2/1963 | Hartsell | 156/548 |
| 3,082,141 | 3/1963 | Steele | 156/189 |
| 3,164,507 | 1/1965 | Masuda | 156/197 |
| 3,165,820 | 1/1965 | Fromson | 156/197 X |
| 3,189,501 | 6/1965 | White | 156/189 |
| 3,225,407 | 12/1965 | Daniels | 24/457 X |
| 3,281,516 | 10/1966 | Southwick | 264/285 |
| 3,416,051 | 12/1968 | Pinto | 318/6 |
| 3,428,515 | 2/1969 | Lorentzen | 428/117 |
| 3,762,980 | 10/1973 | Maggio | 156/461 |
| 3,837,972 | 9/1974 | Schuster | 156/466 |
| 3,963,549 | 6/1976 | Rasmussen | 156/193 |
| 4,187,896 | 2/1980 | Shore | 428/12 X |
| 4,242,161 | 12/1980 | Hulten | 156/197 |
| 4,249,478 | 2/1981 | Gruener | 118/668 |
| 4,256,526 | 3/1981 | McDaniel | 156/295 |
| 4,288,485 | 9/1981 | Suominen | 428/116 |
| 4,346,132 | 8/1982 | Cheng | 428/76 |
| 4,431,690 | 2/1984 | Matt | 427/424 |
| 4,450,027 | 5/1984 | Colson | 428/116 X |
| 4,453,584 | 6/1984 | Steele | 428/100 X |
| 4,603,072 | 7/1986 | Colson | 428/116 |
| 4,676,855 | 6/1987 | Anderson | 156/193 |
| 4,677,012 | 6/1987 | Anderson | 428/116 |

FOREIGN PATENT DOCUMENTS

| | | | |
|---|---|---|---|
| 129793 | 11/1948 | Australia | 428/116 |
| 1568745 | 5/1969 | France . | |
| 57-60588 | 4/1982 | Japan | 428/181 |
| 988064 | 4/1965 | United Kingdom | 428/116 |
| 1308296 | 2/1973 | United Kingdom | 428/116 |

*Primary Examiner*—Henry F. Epstein

[57] ABSTRACT

Mounting apparatus for expandable honeycomb insulation panels includes a head rail for anchoring the panel to a window jamb or wall and a sill rail at the opposite end of the honeycomb panel for contracting and expanding the honeycomb panel to move it upwardly and downwardly over the window surface. Lift mechanisms for the sill rail include a vertical drop cord lift system, a parallel bar cord guided system, and a continuous loop cord system. Edge seals for closing and sealing the end of the honeycomb insulation panel include a biased, elongated seal element positioned in the tracks for slideably guiding the honeycomb panel along a prescribed track while sealing the ends thereof. In an alternate embodiment, notched bearing edges are provided to accommodate a web track protruding therein. Other features include adjustable panel mounting, bracket, and cord lock roller.

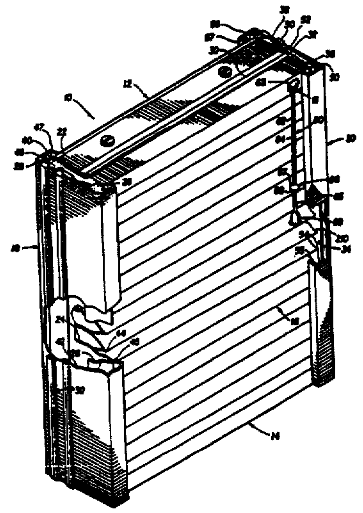

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 21–36 is confirmed.

Claims 1–4 are determined to be patentable as amended.

Claims 5–20, dependent on an amended claim, are determined to be patentable.

New claims 37–39 are added and determined to be patentable.

1. In an expandable honeycomb insulation panel having a plurality of elongated tubular parallel cell structures stacked and fastened together to form the panel, the improvement comprising:

two parallel elongated members positioned apart from each other a spaced distance less than the width of the cell structures, and extending parallel to the length thereof with one of said cell structures positioned on the opposite side of said parallel members from the next adjacent cell structure[.]*; and*

*stiffener means positioned in, but not fixedly attached to, said one cell structure for preventing said one cell structure from collapsing and moving through the space between said parallel members.*

2. The improvement of claim 1, [including stiffener means positioned in said one cell structure for preventing said one cell structure from collapsing and moving through the space between said parallel members] *wherein said stiffener means is an elongated rigid member inserted longitudinally in said one cell structure, which rigid member is wider than the distance between said parallel members.*

3. The improvement of claim 2, wherein said stiffener means is [an elongated rigid member inserted longitudinally in said one cell structure, which rigid member is wider than the distance between said parallel members] *wider than the sum of the distance between said parallel members and the length of either one of the parallel members.*

4. In an expandable honeycomb insulation panel having a plurality of elongated tubular parallel cell structures stacked and fastened together to form the panel, the improvement comprising:

two parallel elongated members positioned apart from each other a spaced distance less than the width of the cell structures, with one of said cell structures positioned on the opposite side of said parallel members from the next adjacent cell structure;

stiffener *means* positioned in, *but not fixedly attached to,* said one cell structure for preventing said one cell structure from collapsing and moving through the space between said parallel members; and an elongated head rail in the shape of a channel, said parallel members being formed by a pair of lips protruding inwardly toward each other from the distal ends of the channel flanges, and said one cell structure and said stiffener means being positioned in said channel.

*37. The improvement of claim 4, wherein said stiffener means is wider than the sum of the distance between said parallel members and the length of either one of said parallel members.*

*38. The improvement of claim 4, wherein said stiffener means is an elongated rigid member having a substantially flat surface and said panel extends approximately perpendicular to the flat surface of the stiffener means.*

*39. The improvement of claim 4, wherein the channel of the elongated head rail defines an accommodation space for positioning two or more of said cell structures on the opposite side of said parallel members from the next adjacent cell structure to adjust the length of the panel.*

* * * * *